United States Patent [19]

Kawamura

[11] Patent Number: 5,793,532
[45] Date of Patent: Aug. 11, 1998

[54] ZOOM LENS

[75] Inventor: Kazuteru Kawamura, Hachioji, Japan

[73] Assignee: Olympus Optical Co., Ltd., Tokyo, Japan

[21] Appl. No.: 521,067

[22] Filed: Aug. 29, 1995

[30] Foreign Application Priority Data

Aug. 29, 1994 [JP] Japan ................... 6-203201

[51] Int. Cl.$^6$ ............... G02B 15/14; G02B 3/02
[52] U.S. Cl. ........................... 359/686; 359/715
[58] Field of Search ...................... 359/686, 715

[56] References Cited

U.S. PATENT DOCUMENTS

| | | | |
|---|---|---|---|
| 4,756,609 | 7/1988 | Estelle | 359/686 |
| 4,787,718 | 11/1988 | Cho | 359/686 |
| 5,111,338 | 5/1992 | Nakayama | 359/686 |
| 5,270,865 | 12/1993 | Kikuchi et al. | 359/686 |
| 5,274,504 | 12/1993 | Itoh | 359/676 |
| 5,365,376 | 11/1994 | Itoh | 359/686 |

FOREIGN PATENT DOCUMENTS

| | | |
|---|---|---|
| 63-58326 | 11/1988 | Japan. |
| 6138391 | 5/1994 | Japan. |
| 6175026 | 6/1994 | Japan. |

Primary Examiner—Georgia Y. Epps
Assistant Examiner—Evelyn A. Lester
Attorney, Agent, or Firm—Cushman Darby & Cushman IP Group of Pillsbury Madison & Sutro LLP

[57] ABSTRACT

The invention provides a high-performance wide-angle zoom lens system which has a zoom ratio of 2 or more and an angle of view of 65° or more at the wide-angle end and comprises a reduced number of lenses, and so is favorable for reducing the size, weight, and cost of a camera used therewith. This zoom lens system comprises a first lens group G1 of negative power, a second lens group G2, a third lens group G3 of positive power and a fourth lens group G4 of negative power, with the space between the respective lens groups being varied for zooming. The first lens group G1 consists of a negative lens alone, the second and third lens groups G2 and G3 include one independent negative lens and two positive lenses in all, and the fourth lens group G4 comprises one negative lens or alternatively two lenses, positive and negative.

23 Claims, 13 Drawing Sheets

5,793,532

1

ZOOM LENS

BACKGROUND OF THE INVENTION

The present invention relates generally to a zoom lens, and more specifically to a zoom lens system having a zoom ratio exceeding 2 and an angle of view exceeding 65 at the wide-angle end and is well fit for use on compact cameras.

In recent years, zoom lenses having a zoom ratio exceeding 2 and a wide angle of view on the wide-angle side have been increasingly in demand for compact cameras. One typical zoom lens system well accommodated to such compact cameras is of a four-group type comprising a first group of negative power, a second group of positive power, a third group of positive power and a fourth group of negative power. Another zoom lens system is also of a four-group type comprising a first group of negative power, a second group of negative power, a third group of positive power and a fourth group of negative power. These zoom lens systems, because of the first groups being of negative power, enable the lens arrangement to be of a retrofocus type such that the back focus on the wide-angle side can be secured in a relatively easy manner.

Negative-positive-positive-negative type zoom lenses, for example, are known from JP-A 62(1987)-235916 (corresponding to U.S. Pat. No. 4,787,718), JP-A 3(1991)-240015 (corresponding to U.S. Pat. No. 5,111,338), JP-A 4(1992)-237009 (corresponding to U.S. Pat. No. 5,111,338), JP-A 6(1994)-175026, JP-B 63(1988)-58326, JP-A 5(1993)-100165 (U.S. Pat. No. 5,270,865), JP-A 64(1989)-88512 (U.S. Pat. No. 4,756,609), JP-A 6(1994)-138391 and JP-A 4(92)-153614 (U.S. Pat. No. 5,274,504).

A negative-negative-positive-negative type zoom lens, on the other hand, is known JP-A 5(1993)-60977 (corresponding to U.S. Pat. No. 5,365,376).

The above JP-A 62-235916 discloses a negative-positive-positive-negative type of four-group zoom lens including eight lens elements in all. However, this zoom lens has a zoom ratio of at most 2 and an angle of view of about 62° at the wide-angle end. Since the foremost lens element in the first group is of strong positive power, it is difficult to secure the back focus so as to achieve a wider-angle system.

JP-A 3-240015, JP-A 4-237009, JP-A 6-175026 and JP-B 6358326 disclose zoom lenses having a zoom ratio almost as high as 3. With these zoom lenses, however, it is difficult to reduce the size, weight, and cost of cameras used therewith, because the number of lens elements is as many as eleven or more.

JP-A 5-100165 discloses a zoom lens having a zoom ratio of about 2.6, but the number of lens elements is as many as nine. Besides, the angle of view at the wide-angle end is as narrow as about 58°.

JP-A 64-88512 discloses a zoom lens having a zoom ratio of 3 and comprising as few as seven lens elements. However, the angle of view at the wide-angle end is about 63°. Besides, since three lens elements of large diameter are used for the fourth group, this zoom lens is very unfavorable for reducing the size, weight, and cost of a camera used therewith.

JP-A 6-138391 discloses a zoom lens having a zoom ratio of a little less than 3 and an angle of view as wide as 74° at the wide-angle end. However, since the number of lens elements is as many as nine and three lens elements of large diameter are used for the fourth group, this zoom lens is very unfavorable for reducing the size, weight, and cost of a camera used therewith.

2

JP-A 4-153614 discloses a zoom lens having a zoom ratio of a little less than 3 and comprising as small as four lens elements. However, the angle of view of this zoom lens at the wide-angle end is about 62°. Since this zoom lens is optically close to a two-group zoom lens of positive power and negative power for the reason that the amount of variation in the space between the first and second groups and the space between the third and fourth groups during zooming is very limited, curvature of field becomes large at an intermediate focal length. Besides, it is difficult to secure the back focus when it is intended to achieve a system having a wider angle of view.

JP-A 5-60977 discloses one negative-negative-positive-negative type or four-group type zoom lens having a zoom ratio of a little less than 3 and comprising five or six lens elements. Since this zoom lens is optically close to a two group zoom lens of positive power and negative power for the reason that the amount of variation in the space between the first and second groups and the space between the third and fourth groups during zooming is very limited, as is the case with JP-A 4-153614, curvature of field becomes large at an intermediate focal length. Besides, it is difficult to secure the back focus when it is intended to achieve a system having a wider angle of view.

SUMMARY OF THE INVENTION

In view of the above-mentioned problems associated with the prior art, the object of the present invention is to provide a wide-angle zoom lens system which has a zoom ratio of 2 or more and an angle of view of 65° or more at the wide-angle end, comprising a reduced number of lenses and so is very favorable for reducing the size, weight, and cost of a camera used therewith, and has high performance over the range from the wide-angle to telephoto end.

According to the first aspect of the present invention, the above object is achieved by the provision of a zoom lens system comprising, in order from the object side, a first lens group of negative power, a second lens group including at least one lens, a third lens group of positive power and a fourth lens group of negative power, with the space between the respective lens groups being varied for zooming, characterized in that the first lens group consists of a negative lens alone, the second and third lens groups include one independent negative lens and two positive lenses in all, and the fourth lens group consists of one negative lens, or alternatively two lenses, positive and negative, in order from the object side.

According to the second aspect of the present invention, there is provided a zoom lens system comprising, in order from the object side, a first lens group of negative power, a second lens group of negative power, a third lens group of positive power and a fourth lens group of negative power, with the space between the respective lens groups being varied for zooming, characterized by satisfying the following inequality (3):

$$0.75 < |f1|/fW < 4.0 \tag{3}$$

wherein f1 is the focal length of the first lens group, and fw is the focal length of the overall system at the wide-angle end.

According to the third aspect of the present invention, there is provided a zoom lens system comprising, in order from the object side, a first lens group of negative power, a second lens group including at least one lens, a third lens group of positive power and a fourth lens group of negative power, with the space between the respective lens groups being varied for zooming, characterized in that the spaces between the first and second lens groups and between the third and fourth lens groups reach a maximum in the vicinity of the wide-angle end, and characterized by satisfying the following inequality (5):

$$|f2/fT|>1.0 \tag{5}$$

wherein f2 is the focal length of the second lens group, and fT is the focal length of the overall system at the telephoto end.

Reference will now be made to why the above arrangements are used and how they act.

First, the first zoom lens system of the present invention is explained with reference to FIG. 1A that is a schematic view of the first zoom lens system. According to the first zoom lens of the present invention, since the first lens group G1 is made up of a negative lens alone, it is easier to secure the back focus as compared with a system in which the first lens group G1 includes a positive lens. This is true even when the negative lens power of the first lens group G1 is considerably reduced. This in turn allows the use of a smaller negative lens, so that the weight of the first lens group G1 using a lens (or lenses) of large diameter can be reduced with lens cost reductions. Such effects can be further enhanced if the first lens group G1 is constructed from one negative lens.

If the lens arrangement is designed such that the space D12 between the first lens group G1 and the second lens group G2 reaches a maximum at the wide-angle end, it is then much easier to secure the back focus because a strong retrofocus type system is achieved at the wide-angle end.

This enables high-order aberrations introduced by the fourth lens group G4 to be so reduced that the fourth lens group G4 can be constructed from one negative lens or alternatively two lenses, positive and negative, in that order from the object side. Thus, the weight of the fourth lens group G4 comprising a lens (or lenses) of large diameter and proximate to the film side can be reduced with lens cost reductions. Since the fourth lens group G4 can be made thin and the amount of its movement for zooming can be secured, correspondingly, a reduction in the overall lens length and a high zoom ratio exceeding 2 can be achieved without difficulty.

To keep aberrations, mainly curvature of field and distortion within good operating limits over the range from the wide angle to telephoto end, it is desired that the fourth lens group G4 be made up of a meniscus lens concave on the object side when it comprises one negative lens, and be constructed from, in order from the object side, a positive meniscus lens concave on the object side and a negative lens strongly concave on the object side when it comprises two lenses.

Here the first zoom lens system of the present invention should preferably satisfy the following inequality (1):

$$0.75<|f1/fW|<2.3 \tag{1}$$

wherein f1 is the focal length of the first lens group, and fw is the focal length of the overall system at the wide-angle end.

Inequality (1), mentioned just above, shows the condition for securing a reasonable back focus at the wide-angle end and keeping performance in good condition. When the upper limit of 2.3 is exceeded, it is difficult to secure any reasonable back focus at the wide-angle end because the power of the first lens group G1 is diminished, and since the fourth lens group G4 comes near to the film surface, the lens diameter increases with an increase in lens weight and thus resulting in an increase in the size of a camera on which the zoom lens system is to be used. Moreover, since some considerable high-order aberrations are introduced, high performance is not obtained when the fourth lens group G4 comprises up to two lenses. When the lower limit of 0.75 in Inequality (1) is not reached, it is difficult to achieve high performance because of increases in the curvature of field, distortion and chromatic aberration of magnification introduced by the first lens group G1.

It is also preferred that the following inequality (2) be satisfied, $$0.76<|f4/fW|<2.5 \tag{2}$$

wherein f4 is the focal length of the fourth lens group.

Inequality (2), mentioned just above, shows the condition for reducing the overall length of the system at the telephoto end and making the zoom ratio of the system high while the performance of the system is kept in good condition. Exceeding the upper limit of 2.5 is not preferable for making the camera compact, because the amount of movement of the fourth lens group G4 increases with an increase in the overall length of the system at the telephoto end. When the lower limit of 0.76 is not reached, the curvature of field and distortion introduced by the fourth lens group G4 become too large. When it is then intended to construct the fourth lens group G4 from a limited number of lenses, e.g., one or two lenses, it would then be difficult to correct such aberrations.

In the composite arrangement defined by the second and third lens groups G2 and G3, it is desired that positive lenses be located before and after each independent negative lens to provide correction of aberrations.

Since the first lens group G1 is constructed from a negative lens (or lenses) alone, aberrations introduced thereby are mainly off-axis aberrations such as curvature of field and chromatic aberration of magnification. However, since the composite lens arrangement of the second and third lens groups G2 and G3 is constructed as above and the space between the second and third lens groups G2 and G3 is designed to be variable during zooming, the above aberrations can be well corrected by the positive lens being located before the above independent negative lens over the range from the wide-angle to telephoto end. Coma in addition to spherical aberration can be well corrected over the range from the wide-angle to telephoto end, again because the composite lens arrangement of the second and third lens groups G2 and G3 is constructed as above mentioned.

It is also preferred that at least one aspherical surface be incorporated in the composite lens arrangement of the second and third lens groups G2 and G3 to provide correction for spherical aberrations and coma.

It is thus possible to achieve a zoom lens system which, albeit having an angle of view exceeding 65° at the wide-angle end and a zoom ratio as high as 2 or more, enables the lens group of large lens diameter proximate to the object side and the lens group proximate to the film side to be each constructed from a reduced number of lenses, and so is very beneficial to size, weight, and cost reductions. With this lens system, moreover, high performance can be achieved over the range from the wide-angle to telephoto end.

The second zoom lens system of the present invention will now be explained. FIG. 1B is a schematic view of the second zoom lens system of the present invention. The second zoom lens system of the present invention satisfies the following inequality (3):

$$0.75<|f1/fW|<4.0 \tag{3}$$

wherein f1 is the focal length of the first lens group, and fW is the focal length of the overall system at the wide-angle end.

Inequality (3), mentioned just above, shows the condition for enabling the system to have a reasonable back focus at the wide-angle end while maintaining good performance of the system. When the upper limit of 4.0 is exceeded, it is impossible to achieve any high performance because the power of the first lens group G1 diminishes. In other words, the power of the second lens group G2 must be excessively increased to secure the back focus of the system at the wide-angle end. If the back focus is reduced to maintain good performance, the lens diameter of the fourth lens group G4 increases with an increase in the weight thereof, resulting in an increase in the size of a camera on which the system is to be used. Increased lens diameter gives rise to increased high-order aberrations, and leads to an increase in the number of lenses forming the fourth lens group G4.

When the lower limit of 0.75 in Inequality (3) is not reached, it is difficult to make up for increases in the curvature of field, distortion, and chromatic aberration of magnification introduced by the first lens group G1.

Most preferably, the upper limit of Inequality (3) is 3.3. In other words, Inequality (3) should be rewritten as $$0.75 < |f1|/fW < 3.3 \tag{3'}$$

When the upper limit of 3.3 is exceeded, it is impossible to achieve any high performance because the power of the first lens group G1 diminishes; in other words, the power of the second lens group G2 must be excessively increased to secure the back focus of the system at the wide-angle end. If the back focus is reduced to maintain good performance, the lens diameter of the fourth lens group G4 increases with increases in the weight thereof, resulting in an increase in the size of a camera on which the system is to be used. Increased lens diameter gives rise to increased high-order aberrations, and leads to an increase in the number of lenses forming the fourth lens group G4. When the lower limit of 0.75 in Inequality (3') is not reached, it is difficult to make up for increases in the curvature of field, distortion, and chromatic aberration of magnification introduced by the first lens group G1.

It is desired that the second lens group G2 include a positive lens. That is, it is not preferable to construct the second lens group G2 from negative lenses alone, because the amount of rays directed upward by the first and second lens groups G1 and G2 increases, giving rise to an increase in the lens diameter of the third lens group G3 and, hence, resulting in an increase in the amount of spherical aberration introduced.

Even when the first lens group G1 is constructed from a negative lens, or lenses, alone, therefore, the aberrations introduced by the first lens group G1, mainly curvature of field, distortion, and chromatic aberration of magnification can be well corrected by the second lens group G2.

A system with the first lens group G1 constructed from negative lenses alone is easier for securing the back focus than a system with the first lens group G1 including a positive lens. This is true even when the negative lens power of the first lens group G1 is considerably diminished. Thus, the volume of the negative lenses can be reduced, so that the weight of the first lens group G1 of large lens diameter can be reduced with lens cost reductions. Such effects are further enhanced if the first lens group G1 is constructed from one negative lens.

In the composite arrangement defined by the second and third lens groups G2 and G3, it is desired that positive lenses be located before and after each independent negative lens to provide correction of aberrations.

Since the first lens group G1 is constructed from a negative lens (or lenses) alone, the aberrations to be introduced thereby are mainly off-axis aberrations such as curvature of field and chromatic aberration of magnification. However, since the composite lens arrangement of the second and third lens groups G2 and G3 is constructed as above mentioned and the space between the second and third lens groups G2 and G3 is designed to be variable during zooming, the above aberrations can be well corrected by the positive lens located before the above independent negative lens over the range from the wide-angle to telephoto end. Coma in addition to spherical aberration can be well corrected over the range from the wide-angle to telephoto end, again because the composite lens arrangement of the second and third lens groups G2 and G3 is constructed as above mentioned.

It is preferred that the following inequality (4) be satisfied, $$0.5 < |f4|/fW < 3.0 \tag{4}$$

wherein f4 is the focal length of the fourth lens group.

Inequality (4) shows the condition for reducing the overall length of the system at the telephoto end and making the zoom ratio of the system high while good system performance is maintained. Exceeding the upper limit of 3.0 is not preferable for making a compact camera, because the amount of movement of the fourth lens group G4 increases with an increase in the overall length of the system at the telephoto end. When the lower limit of 0.5 is not reached, the curvature of field and distortion introduced by the fourth lens group G4 become excessive. When it is then intended to construct the fourth lens group G4 from a limited number of lenses, e.g., one or two lenses, it would be difficult to correct such aberrations.

It is also preferred that at least one aspherical surface be incorporated in the composite lens arrangement of the second and third lens groups G2 and G3, because spherical aberrations and coma can be easily corrected.

It is thus possible to achieve a zoom lens system which, albeit having an angle of view exceeding 65° at the wide-angle end and a zoom ratio as high as 2 or more, enables the lens group of large lens diameter proximate to the object side and the lens group proximate to the film side to be each constructed from a reduced number of lenses, and so is very beneficial to size, weight, and cost reductions. With this lens system, moreover, high performance can be achieved over the range from the wide-angle to telephoto end.

The third zoom lens system of the present invention will now be explained. A schematic view of this zoom lens is similar to FIG. 1A. The third zoom lens system satisfies the following inequality (5):

$$|f2|/fT > 1.0 \tag{5}$$

wherein f2 is the focal length of the second lens group, and fT is the focal length of the overall system at the telephoto end.

Inequality (5), mentioned just above, shows the condition for reducing degradation of the system due to decentering of the second lens group G2. If the power of the second lens group G2 is within the range defined by Inequality (5), it is then possible to reduce degradation of the system due to decentering of the second lens group G2. This, in turn, makes it possible to assemble the second lens group G2 with low centering precision yet with high efficiency. Moreover, this may be applied to correction of unintentional movement of the hands due to decentration of the second lens group G2, and to correction of parallax due to decentration of the second lens group G2 as well.

The second zoom lens is also designed such that the space D12 between the first lens group G1 and the second lens group G2 reaches a maximum in the vicinity of the wide-angle end, whereby a strong retrofocus type system can be achieved at the wide-angle end to secure the back focus easily.

It is here preferred that the following inequality (6) be satisfied, $$0.76 < |f4/fw| < 2.5 \qquad (6)$$

wherein f4 is the focal length of the fourth lens group, and fW is the focal length of the overall system at the wide-angle end.

Inequality (6) shows the condition for reducing the overall length of the system at the telephoto end and making the zoom ratio of the system high while maintaining good system performance. Exceeding the upper limit of 2.5 is not preferable for making a compact camera, because the amount of movement of the fourth lens group G4 increases with an increase in the overall length of the system at the telephoto end. When the lower limit of 0.76 is not reached, the curvature of field and distortion introduced by the fourth lens group G4 become too large. When it is then intended to construct the fourth lens group G4 from a limited number of lenses, e.g., one or two lenses, it would be difficult to correct aberrations.

It is also desired that the following inequality (7) be satisfied, $$0.75 < |f1/fW| < 4.0 \qquad (7)$$

wherein f1 is the focal length of the first lens group.

Inequality (7) shows the condition for enabling the system to have a reasonable back focus at the wide-angle end while maintaining good system performance. When the upper limit of 4.0 is exceeded, it is impossible to achieve any good performance because the power of the first lens group G1 diminishes. In other words, the power of the second lens group G2 must be excessively increased to secure the back focus of the system at the wide-angle end. If the back focus is reduced to maintain good performance, the lens diameter of the fourth lens group G4 increases with an increase in weight thereof, resulting in an increase in the size of a camera using such a system. Increased lens diameter gives rise to increased high-order aberrations, and leads to an increase in the number of lenses forming the fourth lens group G4.

When the lower limit of 0.75 in Inequality (7) is not reached, it is difficult to make up for increases in the curvature of field, distortion, and chromatic aberration of magnification introduced by the first lens group G1.

Most preferably, the upper limit of Inequality (7) is 3.3. In other words, Inequality (7) should be rewritten as $$0.75 < |f1/fW| < 3.3 \qquad (7')$$

When the upper limit of 3.3 is exceeded, it is impossible to achieve any good performance because the power of the first lens group G1 diminishes. In other words, the power of the second lens group G2 must be excessively increased to secure the back focus of the system at the wide-angle end. If the back focus is reduced to maintain good system performance, the lens diameter of the fourth lens group G4 increases with increases in the weight thereof, resulting in an increase in the size of a camera using such a system. Increased lens diameter gives rise to increased high-order aberrations, and leads to an increase in the number of lenses forming the fourth lens group G4. When the lower limit of 0.75 in Inequality (7') is not reached, it is difficult to make up for increases in the curvature of field, distortion, and chromatic aberration of magnification introduced by the first lens group G1.

It is desired that the second lens group G2 include a positive lens. That is, it is not preferable to construct the second lens group G2 from negative lenses alone because the amount of rays directed upward by the first and second lens groups G1 and G2 increases, giving rise to an increase in the lens diameter of the third lens group G3 and, hence, resulting in an increase in the amount of spherical aberration introduced.

Even when the first lens group G1 is constructed from a negative lens (or lenses) alone, therefore, aberrations introduced by the first lens group G1, mainly curvature of field, distortion, and chromatic aberration of magnification can be well corrected by the second lens group G2.

In the composite arrangement defined by the second and third lens groups G2 and G3, it is desired that positive lenses be located before and after each independent negative lens to provide correction of aberrations.

Since the first lens group G1 is constructed from a negative lens (or lenses) alone, aberrations to be introduced thereby are mainly off-axis aberrations such as curvature of field, and chromatic aberration of magnification. However, since the composite lens arrangement of the second and third lens groups G2 and G3 is constructed as above and the space between the second and third lens groups G2 and G3 is designed to be variable during zooming, the above aberrations can be well corrected by the positive lens located before the above independent negative lens over the range from the wide-angle to telephoto end. Coma in addition to spherical aberration can be well corrected over the range from the wide-angle to telephoto end, again because the composite lens arrangement of the second and third lens groups G2 and G3 is constructed as above mentioned.

It is also preferred that at least one aspherical surface be incorporated in the composite lens arrangement of the second and third lens groups G2 and G3, because spherical aberrations and coma can be easily corrected.

It is thus possible to achieve a zoom lens system which, albeit having an angle of view exceeding 65 at the wideangle end and a zoom ratio as high as 2 or more, enables the lens group of large lens diameter proximate to the object side and the lens group proximate to the film side to be each constructed from a reduced number of lenses, and so is very beneficial to size, weight, and cost reductions. With this lens system, moreover, high performance can be achieved over the range from the wide-angle to telephoto end.

Still other objects and advantages of the invention will be apparent from the specification.

The invention accordingly comprises the features of construction, combinations of elements, and arrangement of parts which will be exemplified in the construction hereinafter set forth, and the scope of the invention will be indicated in the appended claims.

DESCRIPTION OF THE PREFERRED EMBODIMENTS

The zoom lens systems according to Examples 1–11 of the present invention will now be explained with reference to the accompanying drawings.

FIGS. 2A–12A, 2B–12B, and 2C–12C are sectional views of the lens arrangements of Examples 1–11 at the wide-angle end FIGS. 2A–12A, an intermediate focal length FIGS. 2B–12B and the telephoto end FIGS. 2C–12C. Numerical data about the lens system of each example will be given later.

EXAMPLE 1

Figure 1A:
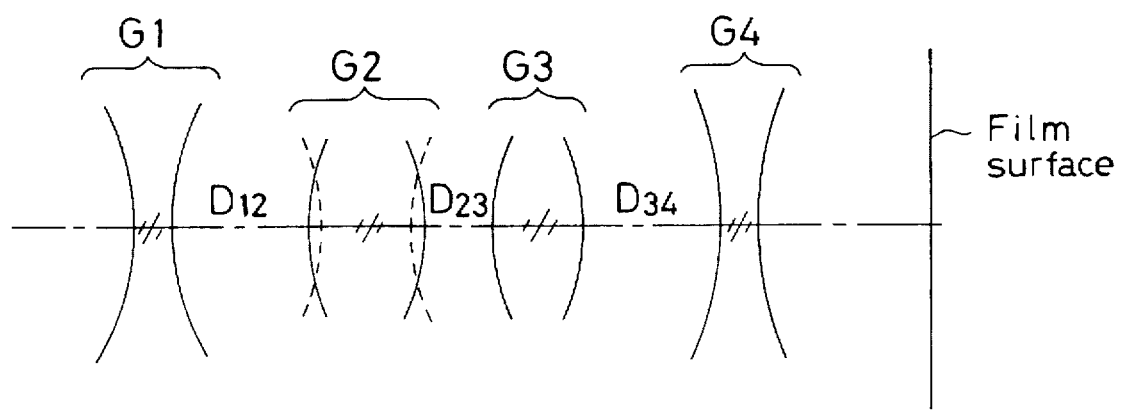
FIGS. 1A and 1B are schematic views of the zoom lens system according to the present invention.
Figure 1B:
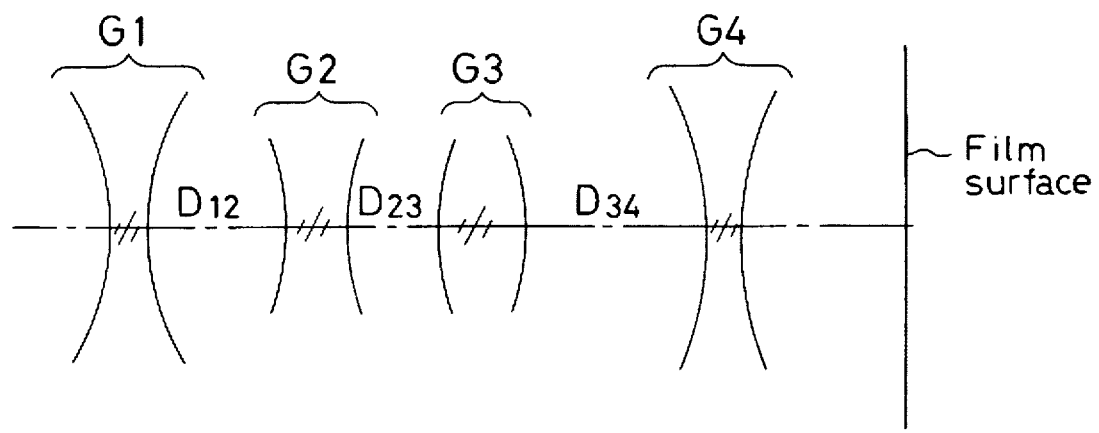
Figure 2A:
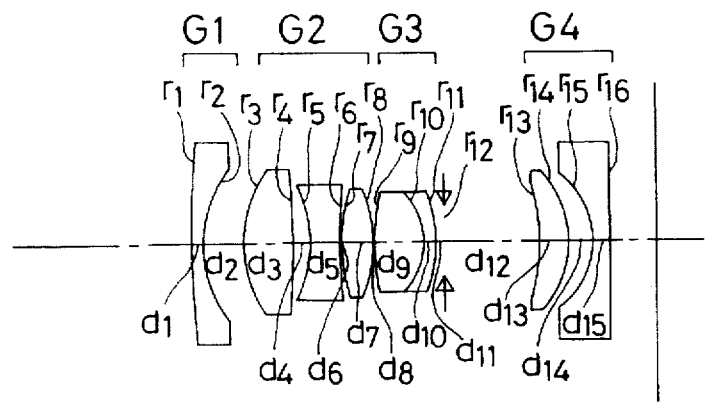
FIGS. 2A–2C are sectional views of the lens arrangements of the zoom lens system according to Example 1 of the present invention, at the wide-angle end FIG. 1A, an intermediate focal length FIG. 1B and the telephoto end FIG. 1C.
Figure 2B:
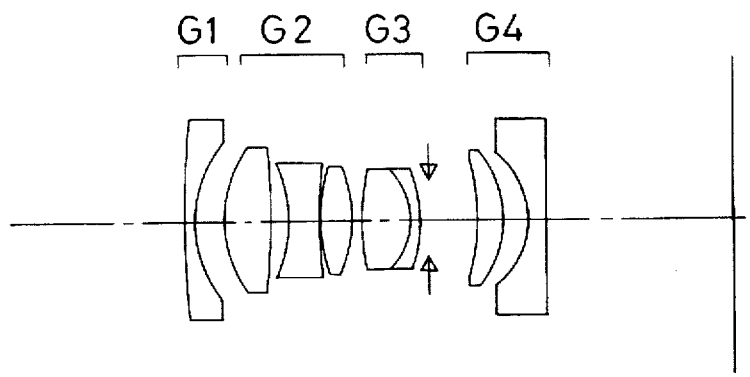
Figure 2C:
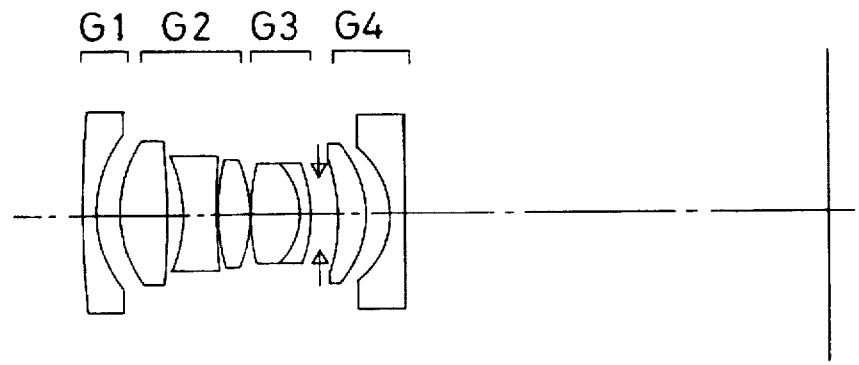

As can be seen from FIGS. 2A–2C, the first lens group G1 consists of one negative meniscus lens concave on the image side; the second lens group G2 has positive power and consists of, in order from the object side, a double convex lens, a double concave lens and a double convex lens, three in all; the third lens group G3 consists of one doublet made up of a double convex lens and a negative meniscus lens; and the fourth lens group G4 consists of a positive meniscus lens convex on the image side and a negative meniscus lens concave on the object side, two in all. Thus, the zoom lens system of this example consists of eight lenses in all. A stop is located as an integral piece on the image side of the third lens group G3. Three aspherical surfaces are used, the first for the surface of the first lens group G1 that is proximate to the image side, the second for the surface of the second lens group G2 that is proximate to the image side, and the third for the surface of the negative meniscus lens of the fourth lens group G4 that is proximate to the object side. During zooming from the wide-angle to telephoto end, the first lens group G1 is moved toward the object side. The space D12 (d2) between the first and second lens groups G1 and G2 decreases monotonically, and the space D23 (do) between the second and third lens groups G2 and G3 reaches a maximum at an intermediate focal length. The space D34 (d12) between the third and fourth lens groups G3 and G4 decreases monotonically.

EXAMPLE 2

Figure 3A:
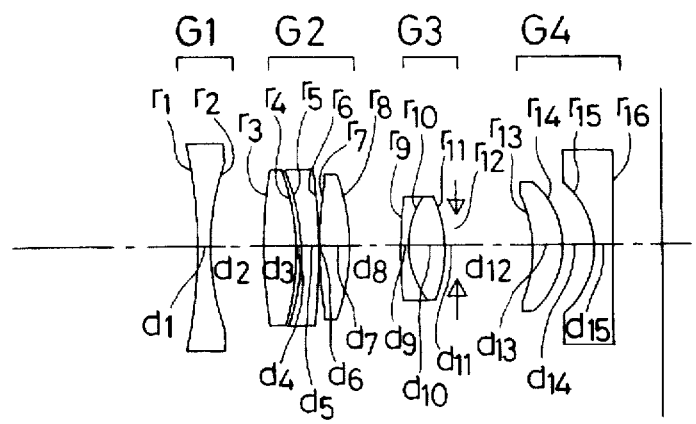
FIGS. 3A–3C are sectional views of Example 2, which are similar to FIGS. 2A–2C.
Figure 3B:
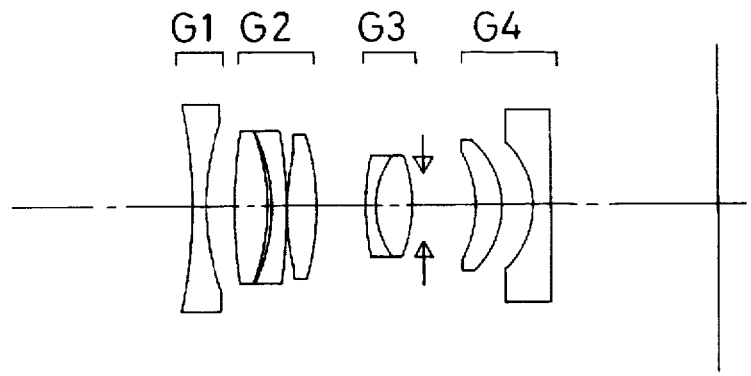
Figure 3C:
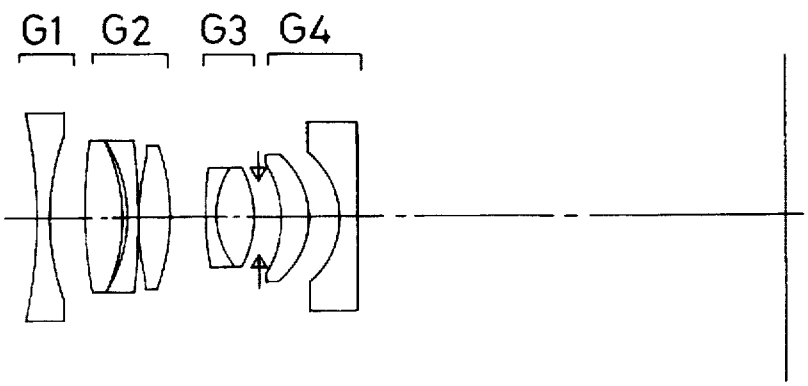

As can be seen from FIGS. 3A–3C, the first lens group G1 consists of one double concave lens; the second lens group G2 has positive power and consists of, in order from the object side, a double convex lens, a negative meniscus lens concave on the object side and a double convex lens, three in all; the third lens group G3 consists of a doublet made up of a negative meniscus lens concave on the image side and a double convex lens; and the fourth lens group G4 consists of a positive meniscus lens convex on the image side and a negative meniscus lens concave on the object side, two in all. Thus, the zoom lens system of this example consists of eight lenses in all. A stop is located as an integral piece on the image side of the third lens group G3. Three aspherical surfaces are used, the first for the surface of the first lens group G1 that is proximate to the image side, the second for the object-side surface of the double convex lens located on the image side of the second lens group G2, and the third for the object-side surface of the negative meniscus lens of the fourth lens group G4. During zooming from the wide-angle to telephoto end, the first lens group G1 is moved toward the object side. The space D12 (d2) between the first and second lens groups G1 and G2 reaches a minimum at an intermediate focal length. The space D23 (d8) between the second and third lens groups G2 and G3, and the space D34 (d12) between the third and fourth lens groups G3 and G4 reach a minimum at the telephoto end.

In this example, the composite magnification of the second and third lens groups G2 and G3 is made smaller than life-size so that the second and third lens groups G2 and G3 can achieve together an inner focus type. Thus, the zoom lens system of this example lends itself to making a camera used therewith water resistant.

EXAMPLE 3

Figure 4A:
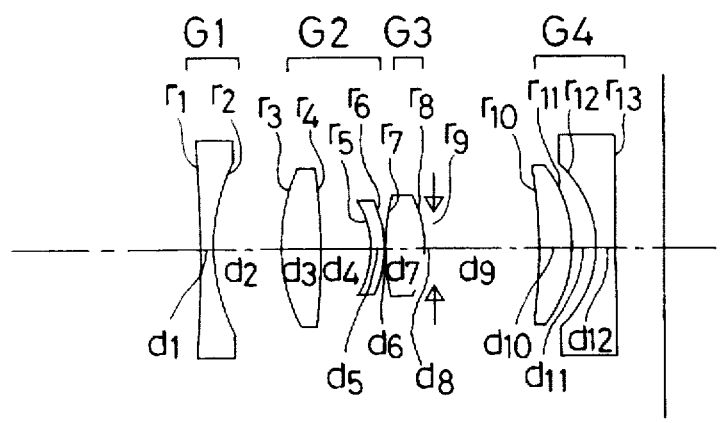
FIGS. 4A–4C are sectional views of Example 3, which are similar to FIGS. 2A–2C.
Figure 4B:
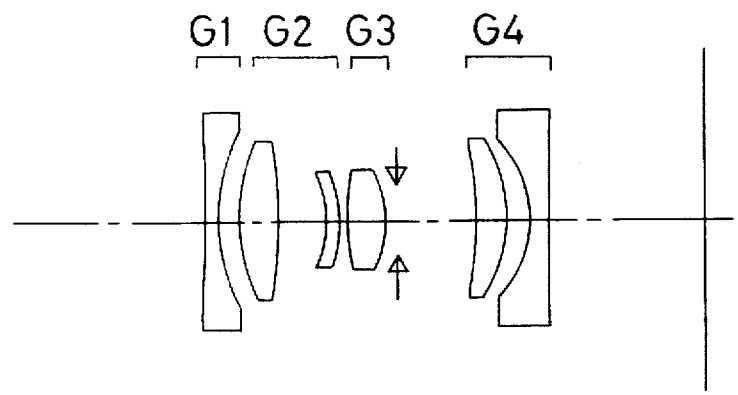
Figure 4C:
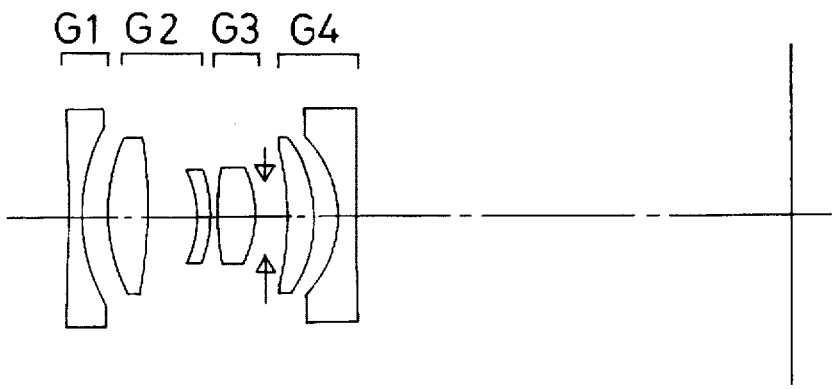

As can be seen from FIGS. 4A–4C, the first lens group G1 consists of one double concave lens; the second lens group G2 has positive power and consists of, in order from the object side, a double convex lens and a negative meniscus lens concave on the object side, two in all; the third lens group G3 consists of one double convex lens; and the fourth lens group G4 consists of a positive meniscus lens convex on the image side and a negative meniscus lens concave on the object side, two in all. Thus, the zoom lens system of this example consists of six lenses in all. A stop is located as an integral piece on the image side of the third lens group G3. Three spherical surfaces are used, the first for the surface of the first lens group G1 that is proximate to the image side, the second for the surface of the third lens group G3 that is proximate to the image side, and the third for the object-side surface of the negative meniscus lens of the fourth lens group G4. During zooming from the wide-angle to telephoto end, the first lens group G1 is moved toward the object side. The space D12 (d2) between the first and second lens groups G1 and G2 reaches a minimum at an intermediate focal length. The space D23 (d9) between the second and third lens groups G2 and G3 increases monotonically, while the space D34 (d9) between the third and fourth lens groups G3 and G4 decreases monotonically.

EXAMPLE 4

Figure 5A:
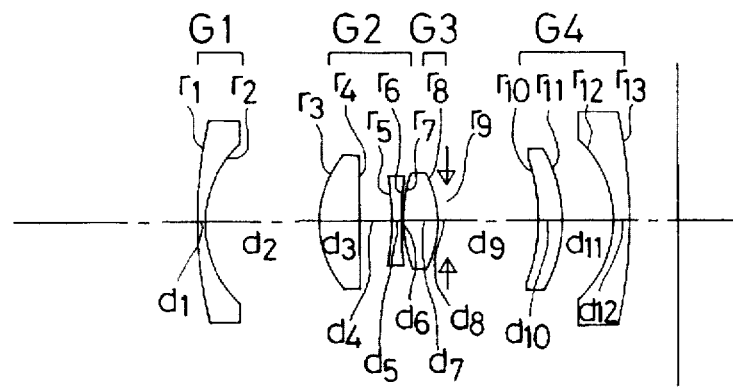
FIGS. 5A–5C are sectional views of Example 4, which are similar to FIGS. 2A–2C.
Figure 5B:
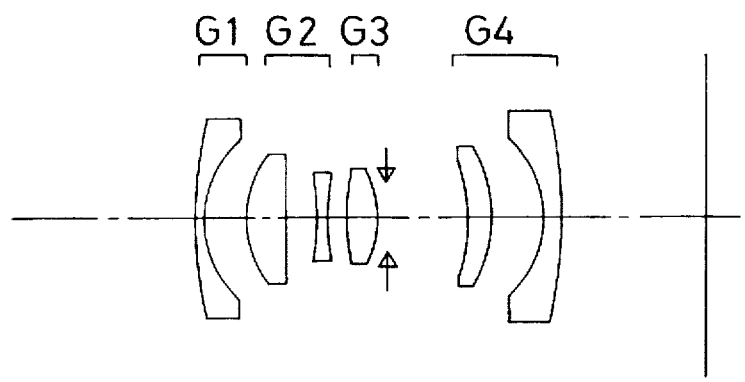
Figure 5C:
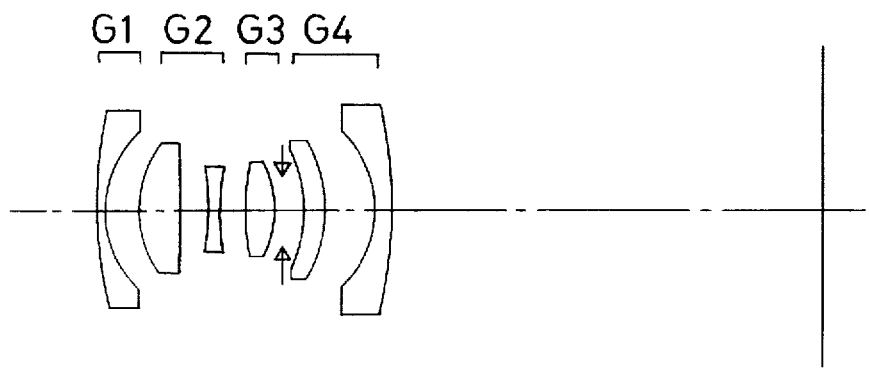

As can be seen from FIGS. 5A–5C, the first lens group G1 consists of one negative meniscus lens concave on the image side; the second lens group G2 has positive power and consists of, in order from the object side, a positive meniscus lens convex on the object side and a double concave lens, two in all; the third lens group G3 consists of one double convex lens; and the fourth lens group G4 consists of a positive meniscus lens convex on the image side and a negative meniscus lens concave on the object side, two in all. Thus, the zoom lens system of this example consists of six lenses in all. A stop is located as an integral piece on the image side of the third lens group G3. Two spherical surfaces are used, one for the object-side surface of the double concave lens of the second lens group G2 and another for the surface of the third lens group G3 that is proximate to the image side. During zooming from the wide-angle to telephoto end, the first lens group G1 is moved toward the object side. The space D12 (d2) between the first and second lens groups G1 and G2 decreases monotonically; the space D23 (d9) between the second and third lens groups G2 and G3 increases monotonically; and the space D34 (d9) between the third and fourth lens groups G3 and G4 decreases monotonically.

EXAMPLE 5

Figure 6A:
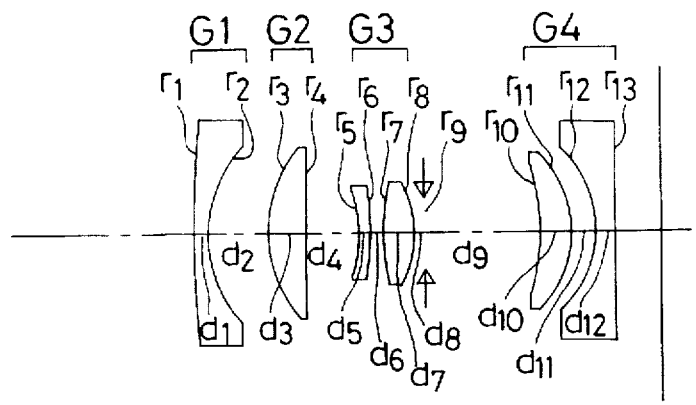
FIGS. 6A–6C are sectional views of Example 5, which are similar to FIG. 2A–2C.
Figure 6B:
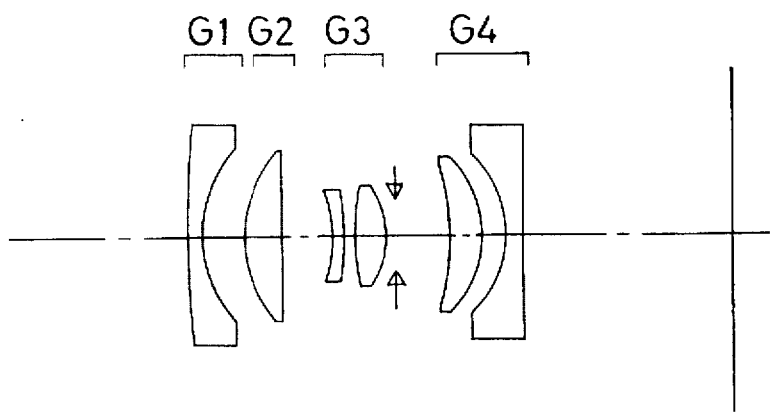
Figure 6C:
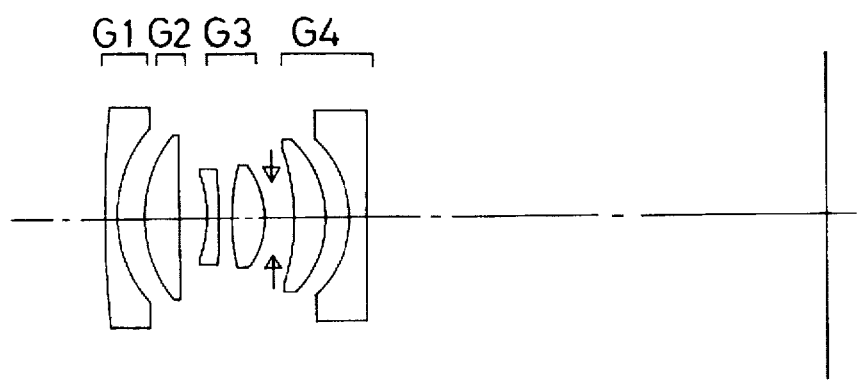

As can be seen from FIGS. 6A–6C, the first lens group G1 consists of one negative meniscus lens concave on the image side; the second lens group G2 has positive power and consists of one positive meniscus lens convex on the object side; the third lens group G3 consists of, in order from the object side, a negative meniscus lens concave on the object side and a double convex lens, two in all; and the fourth lens group G4 consists of a positive meniscus lens convex on the image side and a negative meniscus lens concave on the object side, two in all. Thus, the zoom lens system of this example consists of six lenses in all. A stop is located as an integral piece on the image side of the third lens group G3. Four spherical surfaces are used, the first for the surface of the first lens group G1 that is proximate to the image side; the second for the object-side surface of the negative meniscus lens of the third lens group G3; the third for the image-side surface of the double convex lens of the third lens group G3; and the fourth for object-side surface of the negative meniscus lens of the fourth lens group G4. During zooming from the wide-angle to telephoto end, the first lens group G1 is moved toward the object side. The space D12 (d2) between the first and second lens groups G1 and G2, the space D23 (d4) between the second and third lens groups G2 and G3, and the space D34 (d9) between the third and fourth lens groups G3 and G4 all decrease monotonically. This enables the cam mechanisms used in the zoom lens system to be simplified.

According to this example, inner focus can be achieved by the third lens group G3. In this case, since the focusing group is of small size and consists of a reduced number of lenses, the focusing mechanism is so simplified that the zoom lens system can lend itself to making a camera used therewith waterproof.

EXAMPLE 6

Figure 7A:
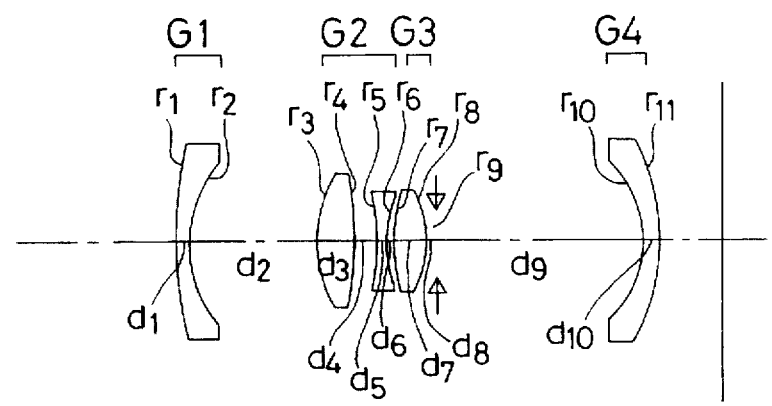
FIGS. 7A–7C are sectional views of Example 6, which are similar to FIGS. 2A–2C.
Figure 7B:
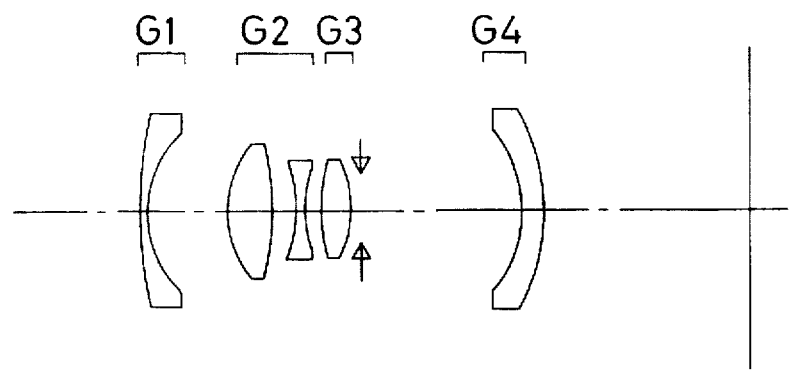
Figure 7C:
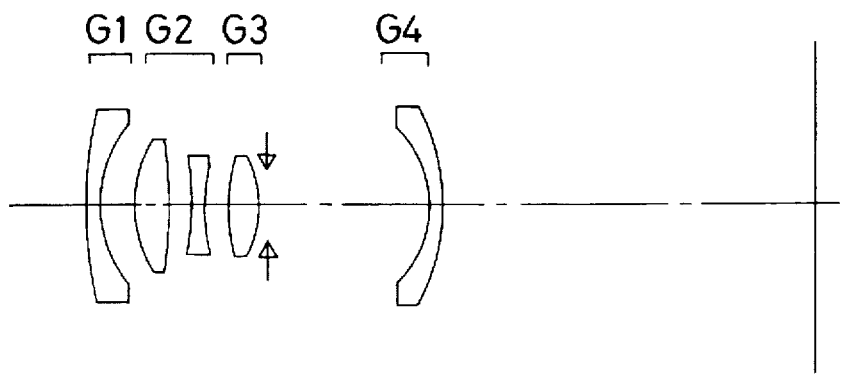

As can be seen from FIGS. 7A–7C, the first lens group G1 consists of one negative meniscus lens concave on the image side; the second lens group G2 has positive power and consists of two lenses, i.e., a double convex lens and a double concave lens; the third lens group G3 consists of one double convex lens; and the fourth lens group G4 consists of one negative meniscus lens concave on the object side. Thus, the zoom lens system of this example is made up of as few as five lenses in all. A stop is located as an integral piece on the image side of the third lens group G3. Three aspherical surfaces are used, the first for the object-side surface of the double concave lens of the second lens group G2; the second for the surface of the third lens group G3 that is proximate to the image side; and the third for the surface of the fourth lens group G4 that is proximate to the object side. During zooming from the wide-angle to telephoto end, the first lens group G1 is moved toward the object side. The space D12 (d2) between the first and second lens groups G1 and G2 decreases monotonically; the space D23 (d9) between the second and third lens groups G2 and G3 increases monotonically; and the space D34 (d9) between the third and fourth lens groups G3 and G4 decreases monotonically.

EXAMPLE 7

Figure 8A:
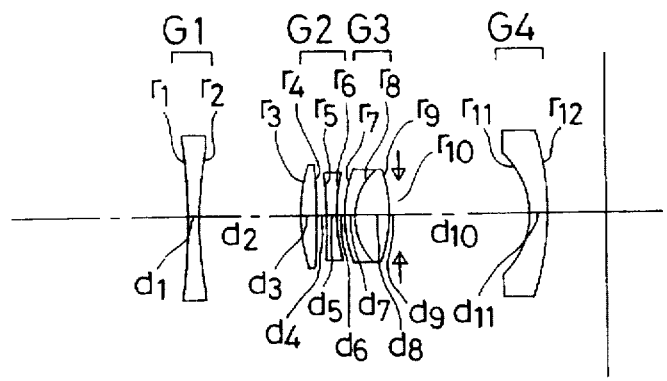
FIGS. 8A–8C are sectional views of Example 7, which are similar to FIGS. 2A–2C.
Figure 8B:
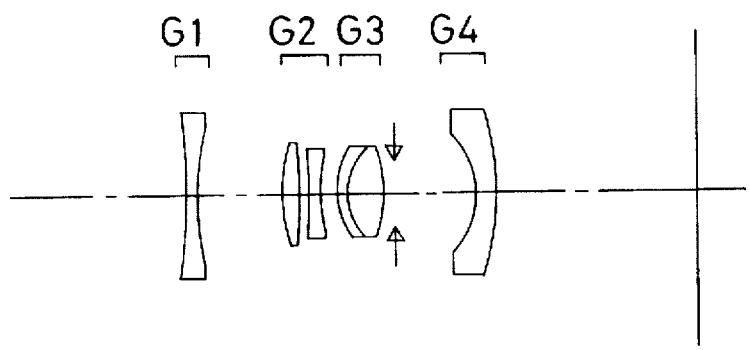
Figure 8C:
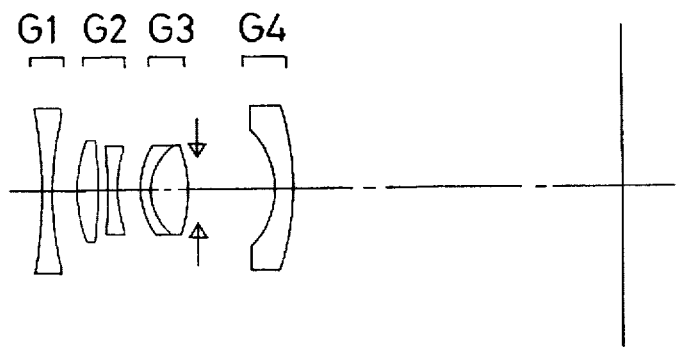

As can be seen from FIGS. 8A–8C, the first lens group G1 consists of one double concave lens; the second lens group G2 has negative power and consists of two lenses, i.e., a double convex lens and a double concave lens; the third lens group G3 consists of a doublet made up of a negative meniscus lens concave on the image side and a double convex lens; and the fourth lens group G4 consists of one negative meniscus lens concave on the object side. Thus, the zoom lens system of this example is made up of as few as six lenses in all. A stop is located as an integral piece on the image side of the third lens group G3. Three aspherical surfaces are used, the first for the surface of the first lens group G1 that is proximate to the image side; the second for the object-side surface of the double concave lens of the second lens group G2; and the third for the surface of the fourth lens group G4 that is proximate to the object side. In this example, the overall length of the system is reduced by increasing the power of the fourth lens group G4. During zooming from the wide-angle to telephoto end, the first lens group G1 is moved toward the object side. The space D12 (d2) between the first and second lens groups G1 and G2 decreases monotonically; the space D23 (d6) between the second and third lens groups G2 and G3 increases monotonically; and the space D34 (d10) between the third and fourth lens groups G3 and G4 decreases monotonically.

EXAMPLE 8

Figure 9A:
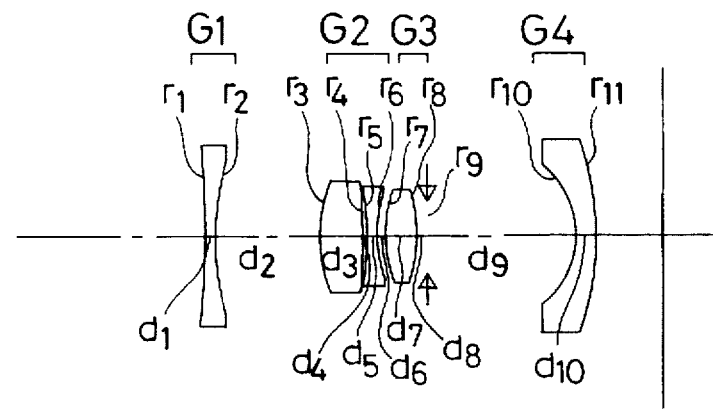
FIGS. 9A–9C are sectional views of Example 8, which are similar to FIGS. 2A–2C.
Figure 9B:
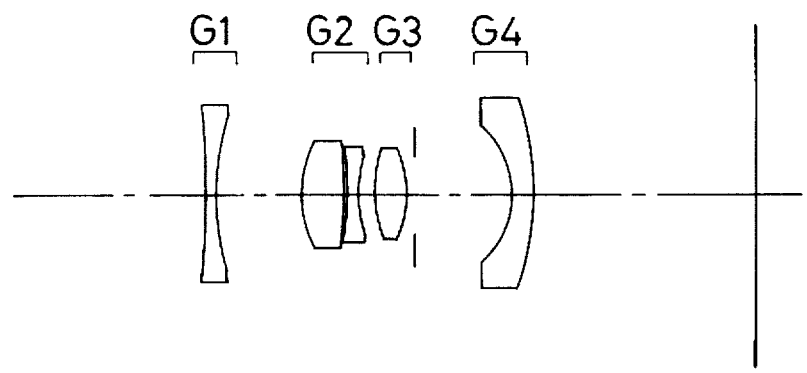
Figure 9C:
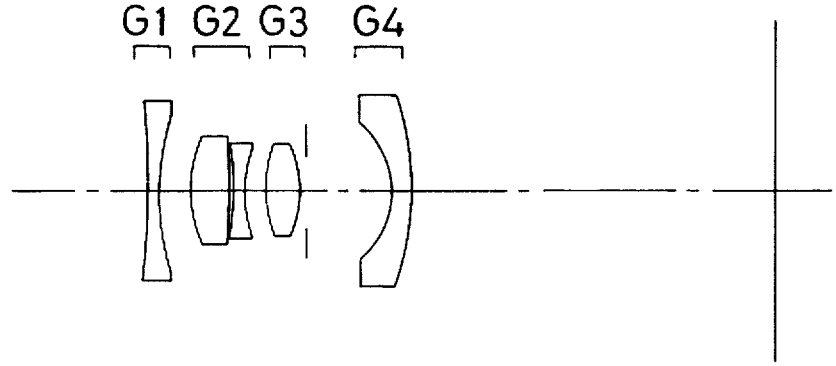

As can be seen from FIGS. 9A–9C, the first lens group G1 consists of one double concave lens; the second lens group G2 has negative power and consists of two lenses, i.e., a double convex lens and a double concave lens; the third lens group G3 consists of one double convex lens; and the fourth lens group G4 consists of one negative meniscus lens concave on the object side. Thus, the zoom lens system of this example is made up of as few as five lenses in all. A stop is located as an integral piece on the image side of the third lens group G3. Four aspherical surfaces are used, the first for the surface of the first lens group G1 that is proximate to the image side; the second for the object-side surface of the double concave lens of the second lens group G2; the third for the surface of the third lens group G3 that is proximate to the image side; and the fourth for the surface of the fourth lens group G4 that is proximate to the object side. In this example, the overall length of the system is reduced by increasing the power of the fourth lens group G4. During zooming from the wide-angle to telephoto end, the first lens group G1 is moved toward the object side. The space D12 (d2) between the first and second lens groups G1 and G2 decreases monotonically; the space D23 (d6) between the second and third lens groups G2 and G3 increases monotonically; and the space D34 (d9) between the third and fourth lens groups G3 and G4 decreases monotonically.

EXAMPLE 9

Figure 10A:
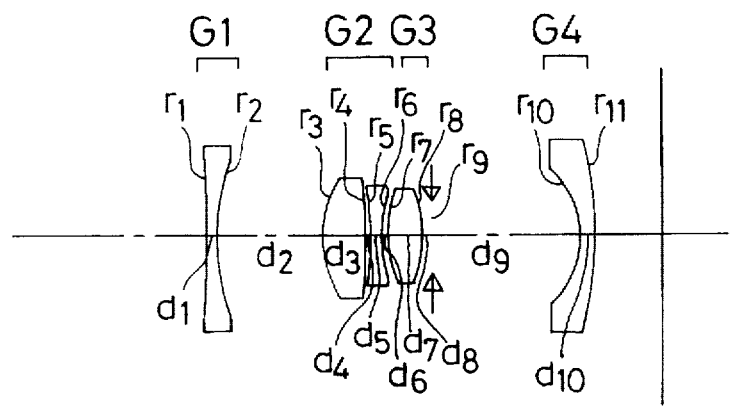
FIGS. 10A–10C are sectional views of Example 9, which are similar to FIGS. 2A–2C.
Figure 10B:
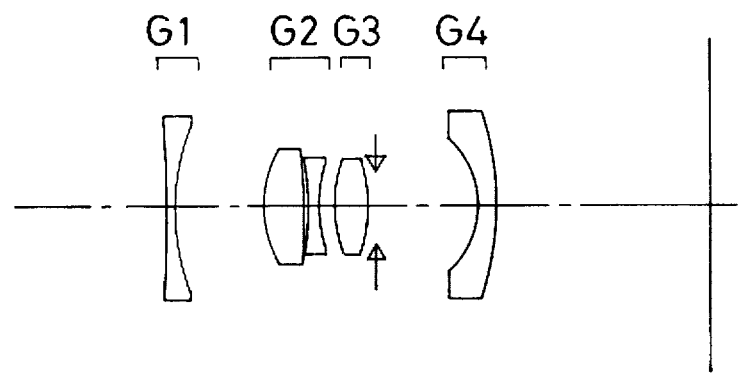
Figure 10C:
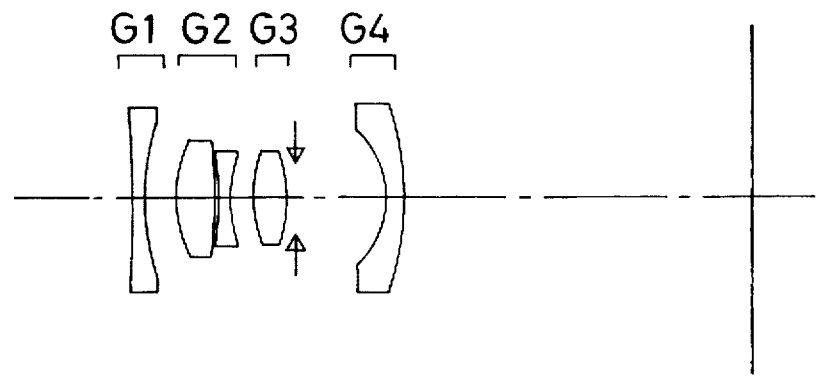

As can be seen from FIGS. 10A–10C, the first lens group G1 consists of one double concave lens; the second lens group G2 has a very weak power and consists of two lenses, i.e., a double convex lens and a double concave lens; the third lens group G3 consists of one double convex lens; and the fourth lens group G4 consists of one negative meniscus lens concave on the object side. Thus, the zoom lens system of this example is made up of as few as five lenses in all. A stop is located as an integral piece on the image side of the third lens group G3. Four aspherical surfaces are used, the first for the surface of the first lens group G1 that is proximate to the image side; the second for the object-side surface of the double concave lens of the second lens group G2; the third for the surface of the third lens group G3 that is proximate to the image side; and the fourth for the surface of the fourth lens group G4 that is proximate to the object side. In this example, the overall length of the system is reduced by increasing the power of the fourth lens group G4. By making the power of the second lens group G2 weak, degradation of the system by decentration of the second lens group G2 is reduced. During zooming from the wide-angle to telephoto end, the first lens group G1 is moved toward the object side. The space D12 (d2) between the first and second lens groups G1 and G2 decreases monotonically; the space D23 (d6) between the second and third lens groups G2 and G3 increases monotonically; and the space D34 (d9) between the third and fourth lens groups G3 and G4 decreases monotonically.

EXAMPLE 10

Figure 11A:
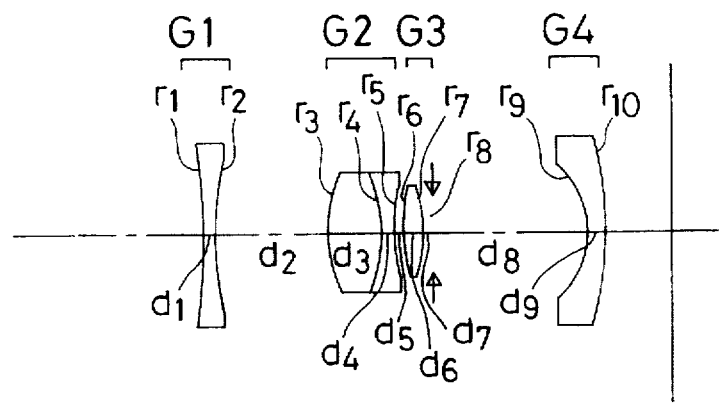
FIGS. 11A–11C are sectional views of Example 10, which are similar to FIGS. 2A–2C.
Figure 11B:
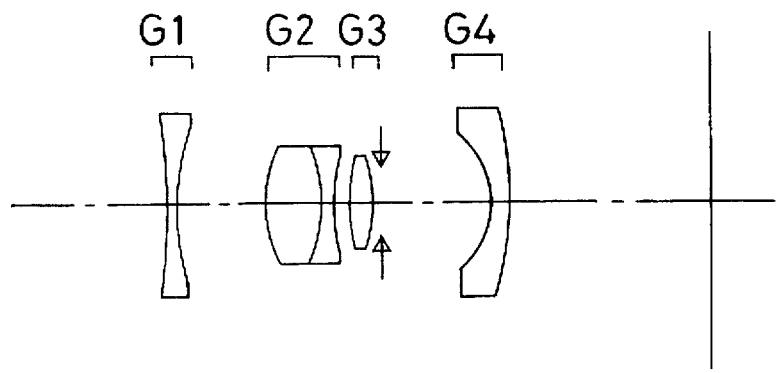
Figure 11C:
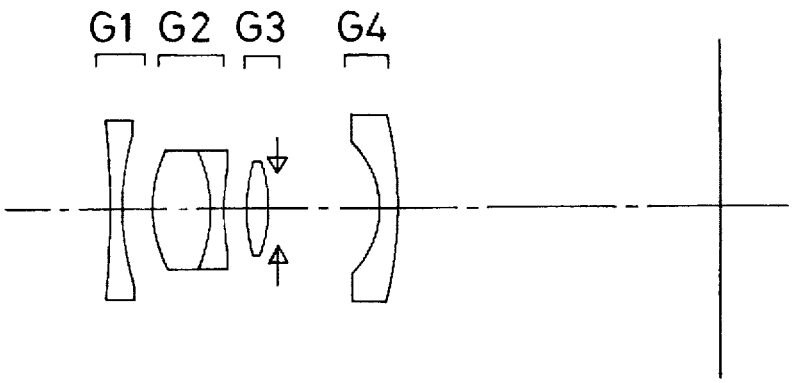

As can be seen from FIGS. 11A–11C, the first lens group G1 consists of one double concave lens; the second lens group G2 has positive power and consists of one doublet made up of a double convex lens and a double concave lens; the third lens group G3 consists of one double convex lens; and the fourth lens group G4 consists of one negative meniscus lens concave on the object side. Thus, the zoom lens system of this example is made up of as few as five lenses in all. A stop is located as an integral piece on the image side of the third lens group G3. Four aspherical surfaces are used, the first for the surface of the first lens group G1 that is proximate to the image side; the second for the surface of the second lens group G2 that is proximate to the image side; the third for the surface of the third lens group G3 that is proximate to the image side; and the fourth for the surface of the fourth lens group G4 that is proximate to the object side. In this example, degradation of the system by decentration of the second lens group G2 is reduced by constructing the second lens group G2 from a doublet. During zooming from the wide-angle to telephoto end, the first lens group G1 is moved toward the object side. The space D12 (d2) between the first and second lens groups G1 and G2 decreases monotonically; the space D23 (d5) between the second and third lens groups G2 and G3 increases monotonically; and the space D34 (d8) between the third and fourth lens groups G3 and G4 decreases monotonically.

EXAMPLE 11

Figure 12A:
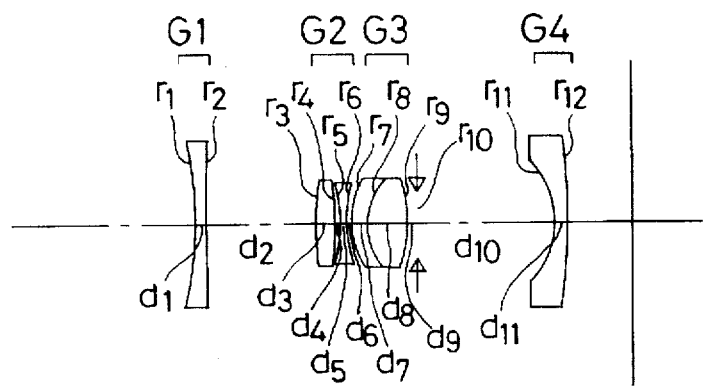
FIGS. 12A–12C are sectional views of Example 11, which are similar to FIGS. 2A–2C.
Figure 12B:
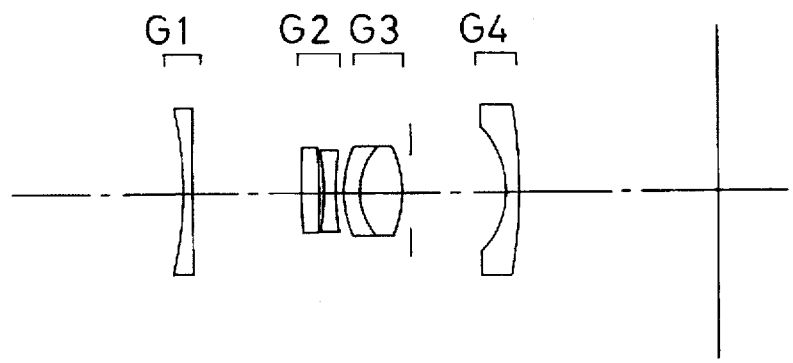
Figure 12C:
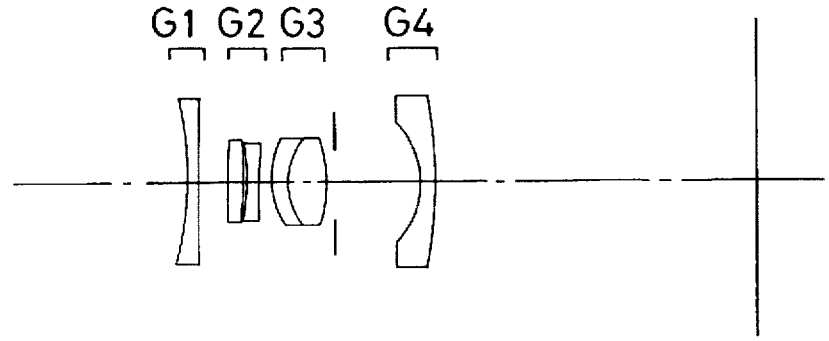

As can be seen from FIGS. 12A–12C, the first lens group G1 consists of one negative meniscus lens concave on the object side; the second lens group G2 has negative power and consists of two lenses, i.e., a double convex lens and a double concave lens; the third lens group G3 consists of one doublet made up of a negative meniscus lens concave on the image side and a double convex lens; and the fourth lens group G4 consists of one negative meniscus lens concave on the object side. Thus, the zoom lens system of this example is made up of as few as six lenses in all. A stop is located as an integral piece on the image side of the third lens group G3. Four aspherical surfaces are used, the first for the surface of the first lens group G1 that is proximate to the image side; the second for the object-side surface of the double concave lens of the second lens group G2; the third for the surface of the third lens group G3 that is proximate to the image side; and the fourth for the surface of the fourth lens group G4 that is proximate to the object side. In this example, the overall length of the system is reduced by increasing the power of the fourth lens group G4. During zooming from the wide-angle to telephoto end, the first lens group G1 is moved toward the object side. The space D12 (d2) between the first and second lens groups G1 and G2 decreases monotonically; the space D23 (d6) between the second and third lens groups G2 and G3 increases monotonically; and the space D34 (d10) between the third and fourth lens groups G3 and G4 decreases monotonically.

In Examples 6–11 mentioned above, during zooming from the wide-angle to telephoto end, the space D12 between the first and second lens groups G1 and G2 decreases monotonically, the space D23 between the second and third lens groups G2 and G3 increases monotonically, and the space D34 between the third and fourth lens groups G3 and G4 decreases monotonically. Thus, the cam mechanism of the zoom lens systems can be simplified.

Set out below are numerical data for the zoom lens system according to each example. Note that the symbols used hereinafter but not referred to hereinbefore, have the following meanings:

FNO is an F-number; 2ω is an angle of view; r1, r2, . . . are the radii of curvature of the lens surfaces; d1, d2, . . . are the separation between the lens surfaces; nd1, nd2, . . . are the d-line indices of refraction of the lenses, and vd1, vd2, . . . are the Abbe's numbers of the lenses. Now let x and y denote the direction of light propagating on the optical axis and the direction perpendicular to the optical axis, respectively. The aspherical surface shape is then represented by $$x = (y^2/r)/[1+\{1-(y/r)^2\}^{1/2}] + A_4 y^4 + A_6 y^6 + A_8 y^8 + A_{10} y^{10}$$

wherein r is the paraxial radius of curvature, and $A_4$, $A_6$, $A_8$ and $A_{10}$ are the fourth, sixth, eighth and tenth aspherical coefficients, respectively.

EXAMPLE 1

$$f = 20.3 \sim 34.6 \sim 58.8$$
$$F_{NO} = 4.65 \sim 6.0 \sim 8.08$$
$$2\omega = 81.7 \sim 54.2 \sim 33.0°$$

| | | | |
|---|---|---|---|
| $r_1 = 144.6501$ | $d_1 = 1.320$ | $n_{d1} = 1.69680$ | $v_{d1} = 55.53$ |
| $r_2 = 13.5156$ (Aspheric) | $d_2 =$ (Variable) | | |
| $r_3 = 14.0724$ | $d_3 = 5.300$ | $n_{d2} = 1.59551$ | $v_{d2} = 39.21$ |
| $r_4 = -65.5683$ | $d_4 = 1.800$ | | |
| $r_5 = -13.4892$ | $d_5 = 3.799$ | $n_{d3} = 1.80440$ | $v_{d3} = 39.58$ |
| $r_6 = 100.9235$ | $d_6 = 0.150$ | | |
| $r_7 = 27.5226$ | $d_7 = 3.300$ | $n_{d4} = 1.48749$ | $v_{d4} = 70.21$ |
| $r_8 = -15.2438$ (Aspheric) | $d_8 =$ (Variable) | | |
| $r_9 = 29.8777$ | $d_9 = 5.700$ | $n_{d5} = 1.54771$ | $v_{d5} = 62.83$ |
| $r_{10} = -7.3236$ | $d_{10} = 1.200$ | $n_{d6} = 1.80610$ | $v_{d6} = 40.95$ |
| $r_{11} = -13.0724$ | $d_{11} = 0.800$ | | |
| $r_{12} = \infty$ (Stop) | $d_{12} =$ (Variable) | | |
| $r_{13} = -24.2750$ | $d_{13} = 2.940$ | $n_{d7} = 1.60342$ | $v_{d7} = 38.01$ |
| $r_{14} = -11.9884$ | $d_{14} = 2.869$ | | |
| $r_{15} = -8.8133$ (Aspheric) | $d_{15} = 1.800$ | $n_{d8} = 1.72916$ | $v_{d8} = 54.68$ |
| $r_{16} = -490.0000$ | | | |

| Zooming Spaces | | | |
|---|---|---|---|
| f | 20.3 | 34.6 | 58.8 |
| $d_2$ | 4.6408 | 3.1266 | 2.5410 |
| $d_8$ | 0.2000 | 0.8852 | 0.1907 |
| $d_{12}$ | 10.3131 | 5.4827 | 2.0000 |

-continued

Aspherical Coefficients

2nd surface $A_4 = 0.54433 \times 10^{-5}$
$A_6 = -0.16121 \times 10^{-6}$
$A_8 = 0.20065 \times 10^{-8}$
$A_{10} = -0.31050 \times 10^{-10}$ 8th surface $A_4 = 0.42150 \times 10^{-4}$
$A_6 = 0.37338 \times 10^{-7}$
$A_8 = -0.73452 \times 10^{-8}$
$A_{10} = -0.18628 \times 10^{-9}$ 15th surface $A_4 = 0.59905 \times 10^{-4}$
$A_6 = 0.13502 \times 10^{-5}$
$A_8 = -0.34295 \times 10^{-7}$
$A_{10} = 0.53340 \times 10^{-8}$

EXAMPLE 2

$f = 20.3 \sim 34.6 \sim 58.8$
$F_{NO} = 4.65 \sim 6.0 \sim 8.07$
$2\omega = 81.4 \sim 52.9 \sim 32.8°$

| | | | |
|---|---|---|---|
| $r_1 = -49.8533$ | $d_1 = 1.320$ | $n_{d1} = 1.69680$ | $v_{d1} = 55.53$ |
| $r_2 = 24.6628$ (Aspheric) | $d_2 = $ (Variable) | | |
| $r_3 = 60.9118$ | $d_3 = 4.000$ | $n_{d2} = 1.60342$ | $v_{d2} = 38.01$ |
| $r_4 = -19.0463$ | $d_4 = 0.313$ | | |
| $r_5 = -16.3388$ | $d_5 = 1.250$ | $n_{d3} = 1.80610$ | $v_{d3} = 40.95$ |
| $r_6 = -91.8678$ | $d_6 = 0.100$ | | |
| $r_7 = 21.9911$ (Aspheric) | $d_7 = 3.300$ | $n_{d4} = 1.48749$ | $v_{d4} = 70.21$ |
| $r_8 = -29.4038$ | $d_8 = $ (Variable) | | |
| $r_9 = 36.3323$ | $d_9 = 1.200$ | $n_{d5} = 1.80610$ | $v_{d5} = 40.95$ |
| $r_{10} = 9.1673$ | $d_{10} = 4.000$ | $n_{d6} = 1.58913$ | $v_{d6} = 61.18$ |
| $r_{11} = -12.7100$ | $d_{11} = 0.800$ | | |
| $r_{12} = \infty$ (Stop) | $d_{12} = $ (Variable) | | |
| $r_{13} = -12.0003$ | $d_{13} = 3.000$ | $n_{d7} = 1.60342$ | $v_{d7} = 38.01$ |
| $r_{14} = -9.8697$ | $d_{14} = 3.491$ | | |
| $r_{15} = -9.4586$ (Aspheric) | $d_{15} = 1.800$ | $n_{d8} = 1.72916$ | $v_{d8} = 54.68$ |
| $r_{16} = -490.0000$ | | | |

Zooming Spaces

| f | 20.3 | 34.6 | 58.8 |
|---|---|---|---|
| $d_2$ | 5.7279 | 2.8571 | 3.9901 |
| $d_8$ | 5.5948 | 5.2235 | 3.8880 |
| $d_{12}$ | 8.5593 | 5.8635 | 2.0000 |

Aspherical Coefficients

2nd surface $A_4 = -0.14931 \times 10^{-4}$
$A_6 = -0.14320 \times 10^{-6}$
$A_8 = -0.52058 \times 10^{-9}$
$A_{10} = -0.91854 \times 10^{-11}$ 7th surface $A_4 = -0.13899 \times 10^{-3}$
$A_6 = -0.79048 \times 10^{-6}$
$A_8 = -0.41477 \times 10^{-8}$
$A_{10} = -0.43632 \times 10^{-10}$ 15th surface $A_4 = 0.55881 \times 10^{-5}$
$A_6 = 0.76576 \times 10^{-6}$
$A_8 = 0.18428 \times 10^{-8}$
$A_{10} = -0.27028 \times 10^{-9}$

EXAMPLE 3

$f = 20.3 \sim 34.5 \sim 58.8$
$F_{NO} = 4.65 \sim 6.0 \sim 8.07$
$2\omega = 80.9 \sim 53.5 \sim 33.0°$

| | | | |
|---|---|---|---|
| $r_1 = -531.8413$ | $d_1 = 1.320$ | $n_{d1} = 1.69680$ | $v_{d1} = 55.53$ |
| $r_2 = 17.7872$ (Aspheric) | $d_2 = $ (Variable) | | |
| $r_3 = 17.7413$ | $d_3 = 4.300$ | $n_{d2} = 1.58144$ | $v_{d2} = 40.75$ |
| $r_4 = -58.8445$ | $d_4 = 5.281$ | | |
| $r_5 = -8.9689$ | $d_5 = 1.250$ | $n_{d3} = 1.84666$ | $v_{d3} = 23.78$ |
| $r_6 = -14.9118$ | $d_6 = $ (Variable) | | |
| $r_7 = 30.2262$ | $d_7 = 4.136$ | $n_{d4} = 1.48749$ | $v_{d4} = 70.21$ |
| $r_8 = -9.6781$ (Aspheric) | $d_8 = 0.800$ | | |
| $r_9 = \infty$ (Stop) | $d_9 = $ (Variable) | | |
| $r_{10} = -49.2998$ | $d_{10} = 3.500$ | $n_{d5} = 1.58144$ | $v_{d5} = 40.75$ |
| $r_{11} = -13.9118$ | $d_{11} = 2.556$ | | |
| $r_{12} = -9.4150$ (Aspheric) | $d_{12} = 1.800$ | $n_{d6} = 1.74100$ | $v_{d6} = 52.65$ |
| $r_{13} = -1000.0000$ | | | |

Zooming Spaces

| f | 20.3 | 34.5 | 58.8 |
|---|---|---|---|
| $d_2$ | 7.2734 | 2.3396 | 2.8406 |
| $d_6$ | 0.1315 | 0.7412 | 0.7596 |
| $d_9$ | 11.1341 | 8.3372 | 2.0000 |

Aspherical Coefficients

2nd surface $A_4 = 0.13874 \times 10^{-4}$
$A_6 = 0.51712 \times 10^{-8}$
$A_8 = -0.97423 \times 10^{-10}$
$A_{10} = -0.84192 \times 10^{-11}$ 8th surface $A_4 = 0.17826 \times 10^{-9}$
$A_6 = 0.49387 \times 10^{-6}$
$A_8 = 0.24971 \times 10^{-7}$
$A_{10} = -0.27700 \times 10^{-9}$ 12th surface $A_4 = 0.93846 \times 10^{-4}$
$A_6 = 0.42423 \times 10^{-6}$
$A_8 = 0.12864 \times 10^{-7}$
$A_{10} = -0.52865 \times 10^{-10}$

EXAMPLE 4

$f = 20.3 \sim 34.6 \sim 58.8$
$F_{NO} = 4.65 \sim 6.0 \sim 8.07$
$2\omega = 79.8 \sim 52.3 \sim 32.9°$

| | | | |
|---|---|---|---|
| $r_1 = 50.7769$ | $d_1 = 1.320$ | $n_{d1} = 1.69680$ | $v_{d1} = 55.53$ |
| $r_2 = 12.1301$ | $d_2 = $ (Variable) | | |
| $r_3 = 12.1199$ | $d_3 = 4.300$ | $n_{d2} = 1.60342$ | $v_{d2} = 38.01$ |
| $r_4 = 322.7801$ | $d_4 = 3.171$ | | |
| $r_5 = -28.5730$ (Aspheric) | $d_5 = 1.250$ | $n_{d3} = 1.80518$ | $v_{d3} = 25.43$ |
| $r_6 = 32.9013$ | $d_6 = $ (Variable) | | |
| $r_7 = 20.4613$ | $d_7 = 3.500$ | $n_{d4} = 1.51823$ | $v_{d4} = 58.96$ |
| $r_8 = -10.4804$ (Aspheric) | $d_8 = 0.800$ | | |
| $r_9 = \infty$ (Stop) | $d_9 = $ (Variable) | | |
| $r_{10} = -17.8870$ | $d_{10} = 2.500$ | $n_{d5} = 1.60562$ | $v_{d5} = 43.72$ |
| $r_{11} = -14.3983$ | $d_{11} = 5.509$ | | |
| $r_{12} = -11.1043$ | $d_{12} = 1.800$ | $n_{d6} = 1.69680$ | $v_{d6} = 55.53$ |
| $r_{13} = -46.4332$ | | | |

Zooming Spaces

| f | 20.3 | 34.6 | 58.8 |
|---|---|---|---|
| $d_2$ | 12.1285 | 4.5364 | 3.6148 |
| $d_6$ | 0.2200 | 1.8350 | 2.4723 |
| $d_9$ | 10.0320 | 8.7973 | 2.0000 |

-continued

Aspherical Coefficients

5th surface $A_4 = -0.18345 \times 10^{-3}$
$A_6 = -0.83193 \times 10^{-6}$
$A_8 = -0.97622 \times 10^{-8}$
$A_{10} = 0.38491 \times 10^{-9}$ 8th surface $A_4 = 0.43642 \times 10^{-4}$
$A_6 = 0.13774 \times 10^{-5}$
$A_8 = -0.21866 \times 10^{-7}$
$A_{10} = 0.61321 \times 10^{-9}$

EXAMPLE 5

$f = 20.3 \sim 34.6 \sim 58.8$
$F_{NO} = 4.65 \sim 6.0 \sim 8.07$
$2\omega = 81.0 \sim 53.8 \sim 33.0°$

| | | | |
|---|---|---|---|
| $r_1 = 148.1707$ | $d_1 = 1.320$ | $n_{d1} = 1.69680$ | $v_{d1} = 55.53$ |
| $r_2 = 12.5201$ (Aspheric) | $d_2$ = (Variable) | | |
| $r_3 = 12.7367$ | $d_3 = 4.300$ | $n_{d2} = 1.60342$ | $v_{d2} = 38.01$ |
| $r_4 = 1095.7828$ | $d_4$ = (Variable) | | |
| $r_5 = -13.7690$ (Aspheric) | $d_5 = 1.250$ | $n_{d3} = 1.84666$ | $v_{d3} = 23.78$ |
| $r_6 = -37.2492$ | $d_6 = 1.328$ | | |
| $r_7 = 27.9939$ | $d_7 = 3.500$ | $n_{d4} = 1.48749$ | $v_{d4} = 70.21$ |
| $r_8 = -9.5079$ (Aspheric) | $d_8 = 0.800$ | | |
| $r_9 = \infty$ (Stop) | $d_9$ = (Variable) | | |
| $r_{10} = -30.8511$ | $d_{10} = 3.500$ | $n_{d5} = 1.60562$ | $v_{d5} = 43.72$ |
| $r_{11} = -12.1721$ | $d_{11} = 2.923$ | | |
| $r_{12} = -9.6883$ (Aspheric) | $d_{12} = 1.800$ | $n_{d6} = 1.69680$ | $v_{d6} = 55.53$ |
| $r_{13} = -1000.0000$ | | | |

Zooming Spaces

| f | 20.3 | 34.6 | 58.8 |
|---|---|---|---|
| $d_2$ | 6.6945 | 4.5230 | 2.8691 |
| $d_4$ | 5.9273 | 5.7507 | 3.1263 |
| $d_9$ | 12.2306 | 5.8700 | 2.0000 |

Aspherical Coefficients

2nd surface $A_4 = -0.15111 \times 10^{-5}$
$A_6 = -0.14483 \times 10^{-6}$
$A_8 = 0.56684 \times 10^{-9}$
$A_{10} = -0.18918 \times 10^{-10}$ 5th surface $A_4 = -0.15931 \times 10^{-3}$
$A_6 = -0.32980 \times 10^{-6}$
$A_8 = -0.67818 \times 10^{-7}$
$A_{10} = 0.18924 \times 10^{-8}$ 8th surface $A_4 = 0.11806 \times 10^{-3}$
$A_6 = 0.10026 \times 10^{-5}$
$A_8 = 0.19414 \times 10^{-7}$
$A_{10} = 0.14525 \times 10^{-9}$ 12th surface $A_4 = 0.51406 \times 10^{-4}$
$A_6 = -0.32953 \times 10^{-7}$
$A_8 = 0.26986 \times 10^{-8}$
$A_{10} = 0.74521 \times 10^{-10}$

EXAMPLE 6

$f = 25.0 \sim 38.7 \sim 60.0$
$F_{NO} = 4.65 \sim 6.0 \sim 8.07$
$2\omega = 67.8 \sim 47.7 \sim 32.0°$

| | | | |
|---|---|---|---|
| $r_1 = 51.1567$ | $d_1 = 1.320$ | $n_{d1} = 1.72916$ | $v_{d1} = 54.68$ |
| $r_2 = 12.3099$ | $d_2$ = (Variable) | | |
| $r_3 = 12.4512$ | $d_3 = 4.300$ | $n_{d2} = 1.60342$ | $v_{d2} = 38.01$ |
| $r_4 = -44.7844$ | $d_4 = 2.539$ | | |
| $r_5 = -25.6832$ (Aspheric) | $d_5 = 1.250$ | $n_{d3} = 1.80518$ | $v_{d3} = 25.43$ |
| $r_6 = 17.9963$ | $d_6$ = (Variable) | | |
| $r_7 = 20.8125$ | $d_7 = 3.500$ | $n_{d4} = 1.53172$ | $v_{d4} = 48.91$ |
| $r_8 = -11.9738$ (Aspheric) | $d_8 = 0.800$ | | |
| $r_9 = \infty$ (Stop) | $d_9$ = (Variable) | | |
| $r_{10} = -12.7788$ (Aspheric) | $d_{10} = 1.800$ | $n_{d5} = 1.72916$ | $v_{d5} = 54.68$ |
| $r_{11} = -23.4571$ | | | |

Zooming Spaces

| f | 25.0 | 38.7 | 60.0 |
|---|---|---|---|
| $d_2$ | 13.9674 | 8.9521 | 3.6942 |
| $d_6$ | 0.6000 | 1.6230 | 2.8808 |
| $d_9$ | 22.1613 | 18.1107 | 17.6041 |

Aspherical Coefficients

5th surface $A_4 = -0.14831 \times 10^{-3}$
$A_6 = -0.79763 \times 10^{-7}$
$A_8 = 0.18412 \times 10^{-8}$
$A_{10} = 0.23448 \times 10^{-9}$ 8th surface $A_4 = -0.61758 \times 10^{-5}$
$A_6 = 0.78212 \times 10^{-6}$
$A_8 = -0.81040 \times 10^{-8}$
$A_{10} = 0.26741 \times 10^{-9}$ 10th surface $A_4 = -0.36116 \times 10^{-5}$
$A_6 = -0.70161 \times 10^{-6}$
$A_8 = 0.11690 \times 10^{-7}$
$A_{10} = -0.67351 \times 10^{-10}$

EXAMPLE 7

$f = 25.0 \sim 38.8 \sim 60.0$
$F_{NO} = 4.65 \sim 6.0 \sim 8.07$
$2\omega = 67.8 \sim 48.6 \sim 31.8°$

| | | | |
|---|---|---|---|
| $r_1 = -61.6724$ | $d_1 = 1.320$ | $n_{d1} = 1.72916$ | $v_{d1} = 54.68$ |
| $r_2 = 48.3801$ (Aspheric) | $d_2$ = (Variable) | | |
| $r_3 = 17.5798$ | $d_3 = 2.013$ | $n_{d2} = 1.60342$ | $v_{d2} = 38.01$ |
| $r_4 = -234.3015$ | $d_4 = 1.053$ | | |
| $r_5 = -151.0186$ (Aspheric) | $d_5 = 1.250$ | $n_{d3} = 1.76182$ | $v_{d3} = 26.52$ |
| $r_6 = 17.6159$ | $d_6$ = (Variable) | | |
| $r_7 = 10.0707$ | $d_7 = 1.200$ | $n_{d4} = 1.72342$ | $v_{d4} = 37.95$ |
| $r_8 = 6.4989$ | $d_8 = 4.000$ | $n_{d5} = 1.53172$ | $v_{d5} = 48.91$ |
| $r_9 = -15.2278$ | $d_9 = 0.800$ | | |
| $r_{10} = \infty$ (Stop) | $d_{10}$ = (Variable) | | |
| $r_{11} = -9.1574$ (Aspheric) | $d_{11} = 1.800$ | $n_{d6} = 1.72916$ | $v_{d6} = 54.68$ |
| $r_{12} = -30.4726$ | | | |

Zooming Spaces

| f | 25.0 | 38.8 | 60.0 |
|---|---|---|---|
| $d_2$ | 10.8056 | 9.1777 | 2.9757 |
| $d_6$ | 0.6000 | 1.8568 | 2.6053 |
| $d_{10}$ | 14.9198 | 9.9540 | 9.0618 |

-continued

Aspherical Coefficients

2nd surface $A_4 = 0.16801 \times 10^{-4}$
$A_6 = -0.65833 \times 10^{-8}$
$A_8 = 0.13631 \times 10^{-8}$
$A_{10} = -0.75952 \times 10^{-11}$

5th surface $A_4 = -0.97765 \times 10^{-4}$
$A_6 = -0.14091 \times 10^{-6}$
$A_8 = -0.18522 \times 10^{-7}$
$A_{10} = 0.31154 \times 10^{-9}$

11th surface $A_4 = -0.43950 \times 10^{-4}$
$A_6 = -0.25247 \times 10^{-5}$
$A_8 = 0.69385 \times 10^{-7}$
$A_{10} = -0.74871 \times 10^{-9}$

EXAMPLE 8

$f = 25.0 \sim 38.7 \sim 60.0$
$F_{NO} = 4.65 \sim 6.0 \sim 8.07$
$2\omega = 67.9 \sim 48.7 \sim 31.9°$

| | | | |
|---|---|---|---|
| $r_1 = -101.2723$ | $d_1 = 1.320$ | $n_{d1} = 1.72916$ | $v_{d1} = 54.68$ |
| $r_2 = 36.9731$ (Aspheric) | $d_2 =$ (Variable) | | |
| $r_3 = 13.0008$ | $d_3 = 4.300$ | $n_{d2} = 1.60342$ | $v_{d2} = 38.01$ |
| $r_4 = -109.1495$ | $d_4 = 0.252$ | | |
| $r_5 = -46.8098$ (Aspheric) | $d_5 = 1.250$ | $n_{d3} = 1.80518$ | $v_{d3} = 25.43$ |
| $r_6 = 16.8896$ | $d_6 =$ (Variable) | | |
| $r_7 = 14.1562$ | $d_7 = 3.500$ | $n_{d4} = 1.53172$ | $v_{d4} = 48.91$ |
| $r_8 = -13.0706$ (Aspheric) | $d_8 = 0.800$ | | |
| $r_9 = \infty$ (Stop) | $d_9 =$ (Variable) | | |
| $r_{10} = -9.3827$ (Aspheric) | $d_{10} = 1.800$ | $n_{d5} = 1.72916$ | $v_{d5} = 54.68$ |
| $r_{11} = -29.8564$ | | | |

Zooming Spaces

| f | 25.0 | 38.7 | 60.0 |
|---|---|---|---|
| $d_2$ | 10.8276 | 9.1237 | 2.9859 |
| $d_6$ | 0.6000 | 1.5754 | 2.2563 |
| $d_9$ | 15.0322 | 10.1355 | 9.2331 |

Aspherical Coefficients

2nd surface $A_4 = 0.18876 \times 10^{-4}$
$A_6 = -0.17838 \times 10^{-7}$
$A_8 = 0.12882 \times 10^{-8}$
$A_{10} = -0.19803 \times 10^{-11}$

5th surface $A_4 = -0.14851 \times 10^{-3}$
$A_6 = 0.67327 \times 10^{-6}$
$A_8 = -0.50872 \times 10^{-7}$
$A_{10} = 0.11489 \times 10^{-8}$

8th surface $A_4 = -0.84242 \times 10^{-5}$
$A_6 = 0.88403 \times 10^{-6}$
$A_8 = 0.10016 \times 10^{-7}$
$A_{10} = -0.27367 \times 10^{-10}$

10th surface $A_4 = -0.18430 \times 10^{-4}$
$A_6 = -0.30893 \times 10^{-5}$
$A_8 = 0.82265 \times 10^{-7}$
$A_{10} = -0.86231 \times 10^{-9}$

EXAMPLE 9

$f = 25.0 \sim 38.7 \sim 60.0$
$F_{NO} = 4.65 \sim 6.0 \sim 8.07$
$2\omega = 67.9 \sim 48.5 \sim 31.9°$

| | | | |
|---|---|---|---|
| $r_1 = -203.6267$ | $d_1 = 1.320$ | $n_{d1} = 1.72916$ | $v_{d1} = 54.68$ |
| $r_2 = 28.0638$ (Aspheric) | $d_2 =$ (Variable) | | |
| $r_3 = 11.8769$ | $d_3 = 4.300$ | $n_{d2} = 1.60342$ | $v_{d2} = 38.01$ |
| $r_4 = -99.0234$ | $d_4 = 0.279$ | | |
| $r_5 = -63.7894$ (Aspheric) | $d_5 = 1.250$ | $n_{d3} = 1.80518$ | $v_{d3} = 25.43$ |
| $r_6 = 14.5598$ | $d_6 =$ (Variable) | | |
| $r_7 = 14.2753$ | $d_7 = 3.500$ | $n_{d4} = 1.53172$ | $v_{d4} = 48.91$ |
| $r_8 = -13.8534$ (Aspheric) | $d_8 = 0.800$ | | |
| $r_9 = \infty$ (Stop) | $d_9 =$ (Variable) | | |
| $r_{10} = -9.9013$ (Aspheric) | $d_{10} = 1.800$ | $n_{d5} = 1.72916$ | $v_{d5} = 54.68$ |
| $r_{11} = -31.0077$ | | | |

Zooming Spaces

| f | 25.0 | 38.7 | 60.0 |
|---|---|---|---|
| $d_2$ | 11.2884 | 9.1486 | 2.9861 |
| $d_6$ | 0.6000 | 1.6529 | 2.4909 |
| $d_9$ | 15.4797 | 10.5656 | 9.9972 |

Aspherical Coefficients

2nd surface $A_4 = 0.23190 \times 10^{-4}$
$A_6 = -0.91160 \times 10^{-9}$
$A_8 = 0.18546 \times 10^{-8}$
$A_{10} = -0.39800 \times 10^{-11}$

5th surface $A_4 = -0.14512 \times 10^{-3}$
$A_6 = 0.93262 \times 10^{-6}$
$A_8 = -0.51591 \times 10^{-7}$
$A_{10} = 0.11894 \times 10^{-8}$

8th surface $A_4 = -0.13634 \times 10^{-4}$
$A_6 = 0.70718 \times 10^{-6}$
$A_8 = 0.15131 \times 10^{-7}$
$A_{10} = -0.43673 \times 10^{-10}$

10th surface $A_4 = -0.21212 \times 10^{-4}$
$A_6 = -0.28619 \times 10^{-5}$
$A_8 = 0.74710 \times 10^{-7}$
$A_{10} = -0.74420 \times 10^{-9}$

EXAMPLE 10

$f = 25.0 \sim 38.6 \sim 60.0$
$F_{NO} = 4.65 \sim 6.0 \sim 8.07$
$2\omega = 69.4 \sim 48.8 \sim 31.8°$

| | | | |
|---|---|---|---|
| $r_1 = -65.9215$ | $d_1 = 1.320$ | $n_{d1} = 1.72916$ | $v_{d1} = 54.68$ |
| $r_2 = 40.0853$ (Aspheric) | $d_2 =$ (Variable) | | |
| $r_3 = 13.1926$ | $d_3 = 6.109$ | $n_{d2} = 1.59270$ | $v_{d2} = 35.29$ |
| $r_4 = -13.3895$ | $d_4 = 1.250$ | $n_{d3} = 1.84666$ | $v_{d3} = 23.78$ |
| $r_5 = 24.0630$ (Aspheric) | $d_5 =$ (Variable) | | |
| $r_6 = 17.3046$ | $d_6 = 2.439$ | $n_{d4} = 1.60342$ | $v_{d4} = 38.01$ |
| $r_7 = -15.5325$ (Aspheric) | $d_7 = 0.800$ | | |
| $r_8 = \infty$ (Stop) | $d_8 =$ (Variable) | | |
| $r_9 = -9.9493$ (Aspheric) | $d_9 = 1.800$ | $n_{d5} = 1.72916$ | $v_{d5} = 54.68$ |
| $r_{10} = -35.8457$ | | | |

Zooming Spaces

| f | 25.0 | 38.6 | 60.0 |
|---|---|---|---|
| $d_2$ | 11.9010 | 9.0591 | 2.9886 |
| $d_5$ | 0.4827 | 1.6529 | 2.3103 |
| $d_8$ | 15.8745 | 11.6577 | 11.2920 |

-continued

Aspherical Coefficients

2nd surface $A_4 = 0.20225 \times 10^{-4}$
$A_6 = 0.34398 \times 10^{-7}$
$A_8 = 0.52468 \times 10^{-9}$
$A_{10} = 0.53670 \times 10^{-11}$ 5th surface $A_4 = 0.10464 \times 10^{-3}$
$A_6 = 0.17620 \times 10^{-6}$
$A_8 = 0.41271 \times 10^{-7}$
$A_{10} = -0.11513 \times 10^{-8}$ 7th surface $A_4 = 0.95017 \times 10^{-5}$
$A_6 = -0.17549 \times 10^{-5}$
$A_8 = 0.10616 \times 10^{-6}$
$A_{10} = -0.20023 \times 10^{-8}$ 9th surface $A_4 = -0.11953 \times 10^{-4}$
$A_6 = -0.25040 \times 10^{-5}$
$A_8 = 0.55466 \times 10^{-7}$
$A_{10} = -0.55018 \times 10^{-9}$

EXAMPLE 11

$f = 26.0 \sim 39.6 \sim 60.0$
$F_{NO} = 4.8 \sim 6.4 \sim 8.5$
$2\omega = 65.8 \sim 47.7 \sim 31.7°$

| | | | |
|---|---|---|---|
| $r_1 = -42.8661$ | $d_1 = 1.300$ | $n_{d1} = 1.72916$ | $v_{d1} = 54.68$ |
| $r_2 = -3287.3298$ (Aspheric) | $d_2 =$ (Variable) | | |
| $r_3 = 44.4545$ | $d_3 = 2.000$ | $n_{d2} = 1.60342$ | $v_{d2} = 38.01$ |
| $r_4 = -60.6215$ | $d_4 = 0.300$ | | |
| $r_5 = -25.4522$ (Aspheric) | $d_5 = 1.250$ | $n_{d3} = 1.76182$ | $v_{d3} = 26.52$ |
| $r_6 = 52.7967$ | $d_6 =$ (Variable) | | |
| $r_7 = 10.7441$ | $d_7 = 1.745$ | $n_{d4} = 1.72342$ | $v_{d4} = 37.95$ |
| $r_8 = 6.5882$ | $d_8 = 4.403$ | $n_{d5} = 1.54072$ | $v_{d5} = 47.20$ |
| $r_9 = -13.1960$ (Aspheric) | $d_9 = 0.800$ | | |
| $r_{10} = \infty$ (Stop) | $d_{10} =$ (Variable) | | |
| $r_{11} = -9.3982$ (Aspheric) | $d_{11} = 1.400$ | $n_{d6} = 1.72916$ | $v_{d6} = 54.68$ |
| $r_{12} = -44.8312$ | | | |

Zooming Spaces

| f | 26.0 | 39.6 | 60.0 |
|---|---|---|---|
| $d_2$ | 11.6276 | 11.8655 | 3.0000 |
| $d_6$ | 0.2052 | 0.9917 | 1.5716 |
| $d_{10}$ | 15.2554 | 10.5359 | 9.2359 |

Aspherical Coefficients

2nd surface $A_4 = 0.54728 \times 10^{-5}$
$A_6 = -0.66174 \times 10^{-7}$
$A_8 = 0.10863 \times 10^{-8}$
$A_{10} = -0.67513 \times 10^{-11}$ 5th surface $A_4 = -0.10836 \times 10^{-3}$
$A_6 = -0.51160 \times 10^{-6}$
$A_8 = 0.20619 \times 10^{-7}$
$A_{10} = 0.27576 \times 10^{-9}$ 9th surface $A_4 = 0.31244 \times 10^{-4}$
$A_6 = 0.73573 \times 10^{-8}$
$A_8 = -0.17945 \times 10^{-8}$
$A_{10} = 0.55525 \times 10^{-10}$ -continued 11th surface $A_4 = -0.12192 \times 10^{-4}$
$A_6 = -0.17153 \times 10^{-5}$
$A_8 = 0.66287 \times 10^{-7}$
$A_{10} = -0.69675 \times 10^{-9}$

| | $f_W$ | $f_T$ | $f_1$ | $f_2$ | $f_3$ | $f_4$ |
|---|---|---|---|---|---|---|
| Ex. 1 | 20.3 | 58.8 | −21.48 | 28.44 | 22.97 | −19.75 |
| Ex. 2 | 20.3 | 58.8 | −23.51 | 26.03 | 22.38 | −16.22 |
| Ex. 3 | 20.3 | 58.8 | −24.68 | 59.87 | 15.57 | −23.43 |
| Ex. 4 | 20.3 | 58.8 | −23.20 | 90.39 | 13.91 | −27.57 |
| Ex. 5 | 20.3 | 58.8 | −19.70 | 21.32 | 25.35 | −28.35 |
| Ex. 6 | 25.0 | 60.0 | −22.56 | 147.57 | 14.84 | −41.44 |
| Ex. 7 | 25.0 | 60.0 | −36.99 | −152.36 | 13.70 | −18.62 |
| Ex. 8 | 25.0 | 60.0 | −36.99 | −285.23 | 13.38 | −19.49 |
| Ex. 9 | 25.0 | 60.0 | −33.75 | 5017.47 | 13.82 | −20.69 |
| Ex. 10 | 25.0 | 60.0 | −34.0 | 1245.49 | 13.96 | −19.46 |
| Ex. 11 | 26.0 | 60.0 | −59.58 | −50.00 | 13.37 | −16.58 |

| | $|f_1/f_W|$ | $|f_4/f_W|$ | $|f_2/f_T|$ |
|---|---|---|---|
| Ex. 1 | 1.06 | 0.97 | 0.48 |
| Ex. 2 | 1.16 | 0.80 | 0.44 |
| Ex. 3 | 1.22 | 1.15 | 1.02 |
| Ex. 4 | 1.14 | 1.29 | 1.54 |
| Ex. 5 | 0.92 | 1.33 | 0.36 |
| Ex. 6 | 1.06 | 1.86 | 2.46 |
| Ex. 7 | 1.66 | 0.83 | 2.54 |
| Ex. 8 | 1.66 | 0.87 | 4.75 |
| Ex. 9 | 1.51 | 0.93 | 83.6 |
| Ex. 10 | 1.52 | 0.84 | 20.76 |
| Ex. 11 | 2.29 | 0.64 | 0.83 |

Figure 13:
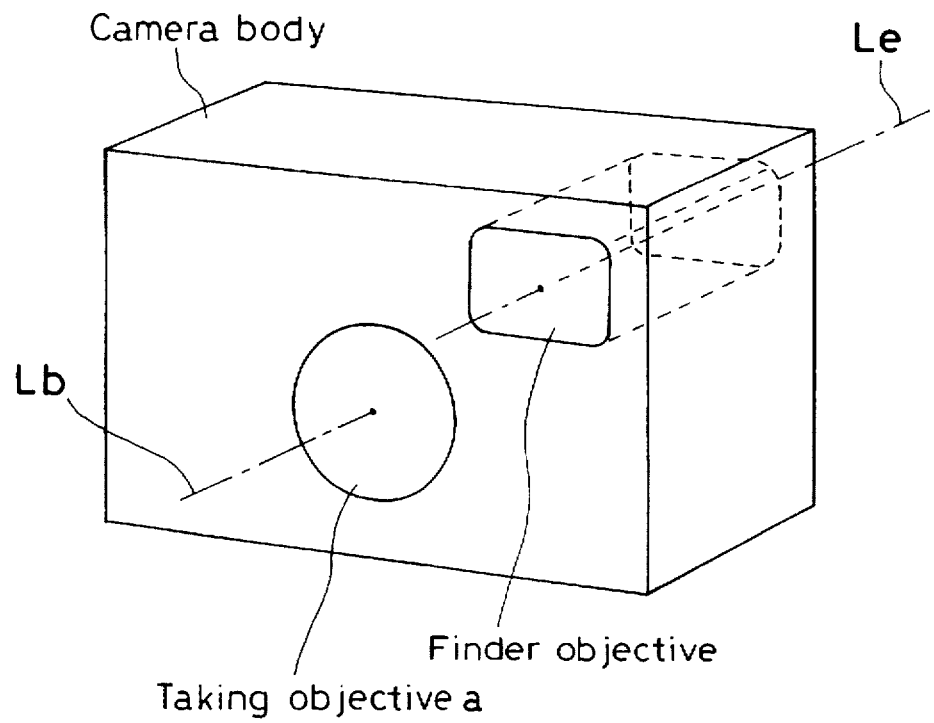
FIG. 13 is a perspective view of a compact camera on which the zoom lens system of the present invention is used.
Figure 14:
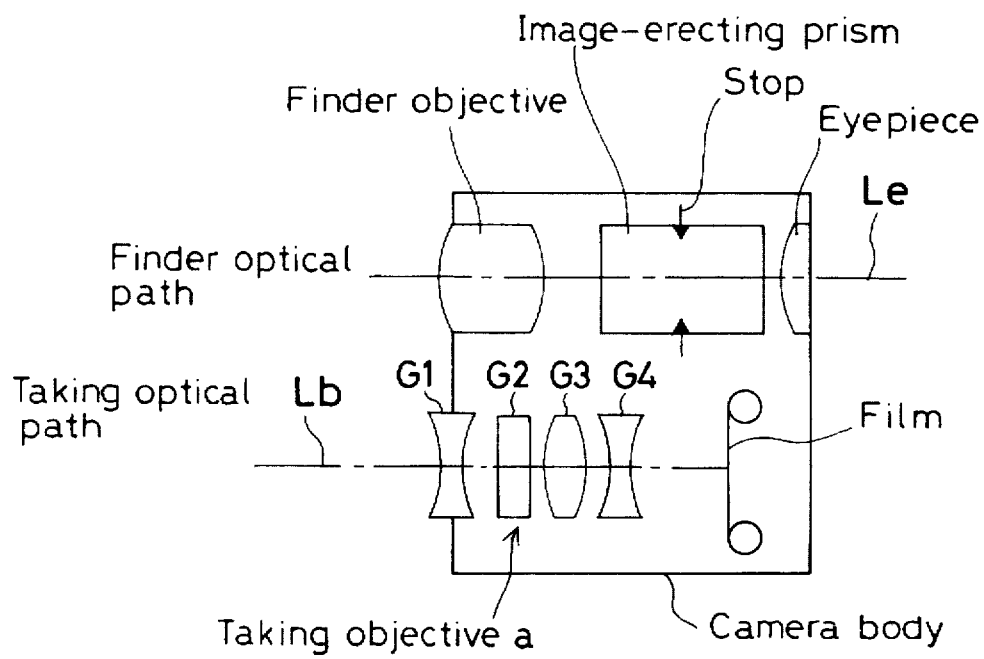
FIG. 14 is a sectional view of a compact camera on which the zoom lens system of the present invention is used.

The zoom lens systems of the present invention, as described above, may be used as a taking objective a for the compact camera of the structure shown in the perspective view of FIG. 13 and the sectional view of FIG. 14 as an example. In FIGS. 13 and 14, Lb stands for a taking optical path and Le denotes a finder optical path. While the optical paths Lb and Le are arranged parallel with each other, the image of the subject is viewed through a finder comprising a finder objective, an image-erecting prism, a stop and an eyepiece, and is focused through the taking objective a onto film.

Here, the taking objective a is constructed from the first lens group G1 consisting of a negative lens alone and having negative power on its entirety, the second lens group G2 including at least one lens and having positive or negative power in its entirety, the third lens group G3 including at least one positive lens and having positive power in its entirety, and the fourth lens group G4 including at least one negative lens and having negative power in its entirety.

As can be understood from the foregoing, the present invention enables the lens group having large diameter and located proximate to the object side and the lens group located proximate to the image side to be each constructed from a reduced number of lenses, thereby achieving weight and cost reductions. According to the present invention, it is possible to achieve a zoom lens system having an angle of view exceeding 65° at the wide-angle end and a zoom ratio as high as 2 or more.

What we claim is:

1. A zoom lens system, in order from an object to an image side, comprising:
a first lens group having a negative power;
a second lens group;

a third lens group having a positive power; and a fourth lens group having a negative power, wherein spaces reserved between the respective lens groups are varied for zooming, the first lens group being characterized by the absence of any positive lens, the second and third lens groups together comprising one independent negative lens and two positive lenses, and the fourth lens group consists of one of A and B, A being one negative lens only, B being a positive lens and a negative lens, in that order from the object side.

2. A zoom lens system according to claim 1, wherein a space reserved between the first and the second lens groups, and a space reserved between the third and the fourth lens groups reach a maximum in the vicinity of the wide-angle end.

3. A zoom lens system according to claim 1 or 2, which satisfies the following inequality:

$$0.75 < |f_1/f_W| < 2.3$$

where $f_1$ is the focal length of the first lens group, and $f_W$ is the focal length of the overall system at the wide-angle end.

4. A zoom lens system according to claim 1 or 2, which satisfies the following inequality:

$$0.76 < |f_4/f_W| < 2.5$$

where $f_4$ is the focal length of the fourth lens group, and $f_W$ is the focal length of the overall system at the wide-angle end.

5. A zoom lens system according to claim 1 or 2 wherein the first lens group consists of a negative lens.

6. A zoom lens system, in order from an object to an image side, comprising:

a first lens group having a negative power;

a second lens group having a negative power;

a third lens group having a positive power; and a fourth lens group having a negative power, wherein spaces reserved between the respective lens groups are varied for zooming, and the zoom lens system satisfies the following inequality:

$$0.75 < |f_1/f_W| < 4.0$$

where $f_1$ is the focal length of the first lens group, and $f_W$ is the focal length of the overall system at the wide-angle end.

7. A zoom lens system according to claim 6, wherein the second lens group includes a positive lens.

8. A zoom lens system according to claim 6 or 7, wherein the second and third lens groups together comprise one independent negative lens and two positive lenses.

9. A zoom lens system according to claim 6 or 7, wherein the first lens group comprises a negative lens.

10. A zoom lens system, in order from an object to an image side, comprising:

a first lens group having a negative power;

a second lens group including at least one lens;

a third lens group having a positive powers; and a fourth lens group having a negative power, wherein spaces reserved between the respective lens groups are varied for zooming such that a space reserved between the first lens group and the second lens group, and a space reserved between the third lens group and the fourth lens group reach a maximum in the vicinity of the wide-angle end, and the zoom lens system satisfies the following inequality:

$$|f_2/f_T| > 1.0$$

where $f_2$ is the focal length of the second lens group, and $f_T$ is the focal length of the overall system at the telephoto end.

11. A zoom lens system according to claim 10, which satisfies the following inequality:

$$0.76 < |f_4/f_W| < 2.5$$

where $f_4$ is the focal length of the fourth lens group, and $f_W$ is the focal length of the overall system at the wide-angle end.

12. A zoom lens system according to claim 10 or 11, which satisfies the following inequality:

$$0.75 < |f_1/f_W| < 4.0$$

where $f_1$ is the focal length of the first lens group, and $f_W$ is the focal length of the overall system at the wide-angle end.

13. A zoom lens system according to claim 10 or 11, wherein the first lens group comprises a negative lens.

14. A zoom lens system according to claim 10 or 11, wherein the first lens group consists of one negative lens.

15. A zoom lens system according to claim 6 or 10, wherein said fourth lens group includes a positive lens and a negative lens.

16. A zoom lens system according to claim 6 or 10, wherein said fourth lens group includes a positive lens and a negative lens, said positive and negative lenses being disposed to face each other across an air space such that said positive lens is located on the object side of said air space, and said negative lens is located on the image side of said air space, said negative lens having an object-side surface which is concave toward the object side.

17. A zoom lens system according to claim 3, which satisfies the following inequality:

$$0.76 < |f_4/f_W| < 2.5$$

where $f_4$ is the focal length of the fourth lens group, and $f_W$ is the focal length of the overall system at the wide-angle end.

18. A zoom lens system according to claim 17, wherein the first lens group consists of a negative lens.

19. A zoom lens system according to claim 4, wherein the first lens group consists of a negative lens.

20. A zoom lens system according to claim 8, wherein the first lens group comprises a negative lens.

21. A zoom lens system according to claim 12, wherein the first lens group comprises a negative lens.

22. A zoom lens system according to claim 21, wherein the first lens group consists of one negative lens.

23. A zoom lens system according to claim 12, wherein the first lens group consists of one negative lens.

* * * * *